(12) United States Patent
Gholkar et al.

(10) Patent No.: US 12,182,025 B2
(45) Date of Patent: *Dec. 31, 2024

(54) FLEXIBLE CACHE ALLOCATION TECHNOLOGY PRIORITY-BASED CACHE LINE EVICTION ALGORITHM

(71) Applicant: Intel Corporation, Santa Clara, CA (US)

(72) Inventors: Neha Gholkar, Milpitas, CA (US); Akhilesh Kumar, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,603

(22) Filed: May 22, 2023

(65) Prior Publication Data

US 2023/0409485 A1     Dec. 21, 2023

Related U.S. Application Data

(63) Continuation of application No. 16/696,548, filed on Nov. 26, 2019, now Pat. No. 11,656,997.

(51) Int. Cl.
*G06F 12/00* (2006.01)
*G06F 12/0891* (2016.01)
*G06F 12/121* (2016.01)

(52) U.S. Cl.
CPC ........ *G06F 12/0891* (2013.01); *G06F 12/121* (2013.01); *G06F 2212/1044* (2013.01); *G06F 2212/60* (2013.01)

(58) Field of Classification Search
CPC .............. G06F 12/0891; G06F 12/121; G06F 2212/1044; G06F 2212/60; G06F 12/0897;

(Continued)

(56) References Cited

U.S. PATENT DOCUMENTS 5,787,490 A      7/1998   Ozawa
2008/0040554 A1  2/2008   Zhao et al.
(Continued)

FOREIGN PATENT DOCUMENTS

JP   09-101916 A      4/1997
JP   2009-163450 A    7/2009
(Continued)

OTHER PUBLICATIONS

European Search Report and Search Opinion, EP App. No. 20198156.0, Apr. 15, 2021, 7 pages.
(Continued)

*Primary Examiner* — Arvind Talukdar
(74) *Attorney, Agent, or Firm* — NICHOLSON DE VOS WEBSTER & ELLIOTT LLP

(57) ABSTRACT

Disclosed embodiments relate to a cache line eviction algorithm. In one example, a system includes a last level cache (LLC) having multiple ways, each allocated to one of multiple priorities, each having specified minimum and maximum ways to occupy, a cache control circuit (CCC) to store an incoming cache line (CL) having a requestor priority to an invalid CL, if any, otherwise, when the requestor priority is a lowest priority and has an occupancy of one or more, or when the occupancy is at a maximum, to evict a least recently used (LRU) CL of the requestor priority, otherwise, when the occupancy is between a minimum and a maximum, to evict a LRU CL of the requestor or a lower priority, otherwise, when the occupancy is less than the minimum, to evict a LRU CL, if any, of the lower priority, and otherwise, to evict a LRU CL of a higher priority.

23 Claims, 19 Drawing Sheets

(58) Field of Classification Search
CPC .... G06F 12/123; G06F 12/128; G06F 12/126; G06F 9/467; G06F 12/08; G06F 12/0811; G06F 9/30098
See application file for complete search history.

(56) References Cited

U.S. PATENT DOCUMENTS

| | | |
|---|---|---|
| 2008/0235457 A1 | 9/2008 | Hasenplaugh et al. |
| 2009/0172289 A1 | 7/2009 | Yamamura et al. |
| 2009/0172315 A1 | 7/2009 | Iyer et al. |
| 2011/0010503 A1 | 1/2011 | Yamamura et al. |
| 2011/0238919 A1 | 9/2011 | Gibson et al. |
| 2013/0297882 A1 | 11/2013 | Yamamoto et al. |
| 2015/0067266 A1 | 3/2015 | Jafri et al. |
| 2016/0283392 A1 | 9/2016 | Greenfield et al. |
| 2017/0116118 A1 | 4/2017 | Artieri et al. |

FOREIGN PATENT DOCUMENTS

| | | |
|---|---|---|
| JP | 2011-018196 A | 1/2011 |
| WO | 2012/095957 A1 | 7/2012 |

OTHER PUBLICATIONS

Examination Report, IN App. No. 202044039405, Mar. 8, 2022, 6 pages.
Notice of Allowance, U.S. Appl. No. 16/696,548, Jan. 25, 2023, 10 pages.
Intention to grant, EP App. No. 20198156.0, Oct. 27, 2023, 09 pages.
Extended European Search Report, EP App. No. 23211531.1, Apr. 3, 2024, 10 pages.
Office Action, JP App. No. 2020-150869, Oct. 22, 2024, 10 pages (06 pages of English Translation and 04 pages of Original Document).

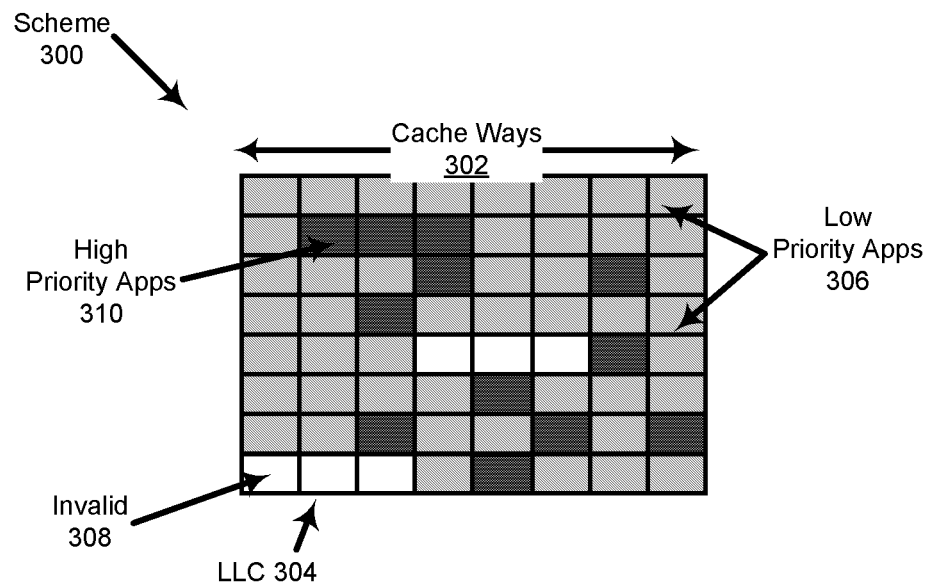
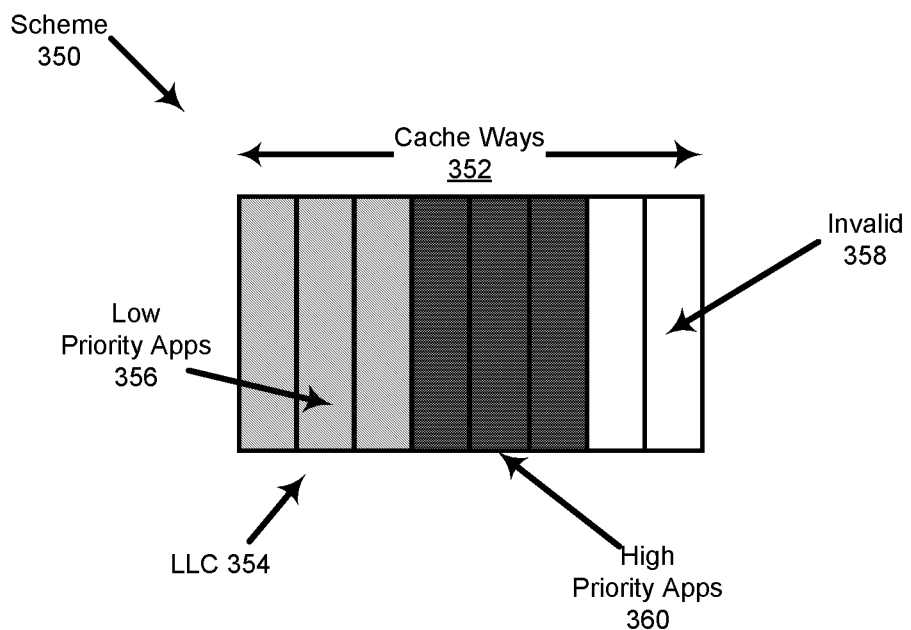
FIG. 3

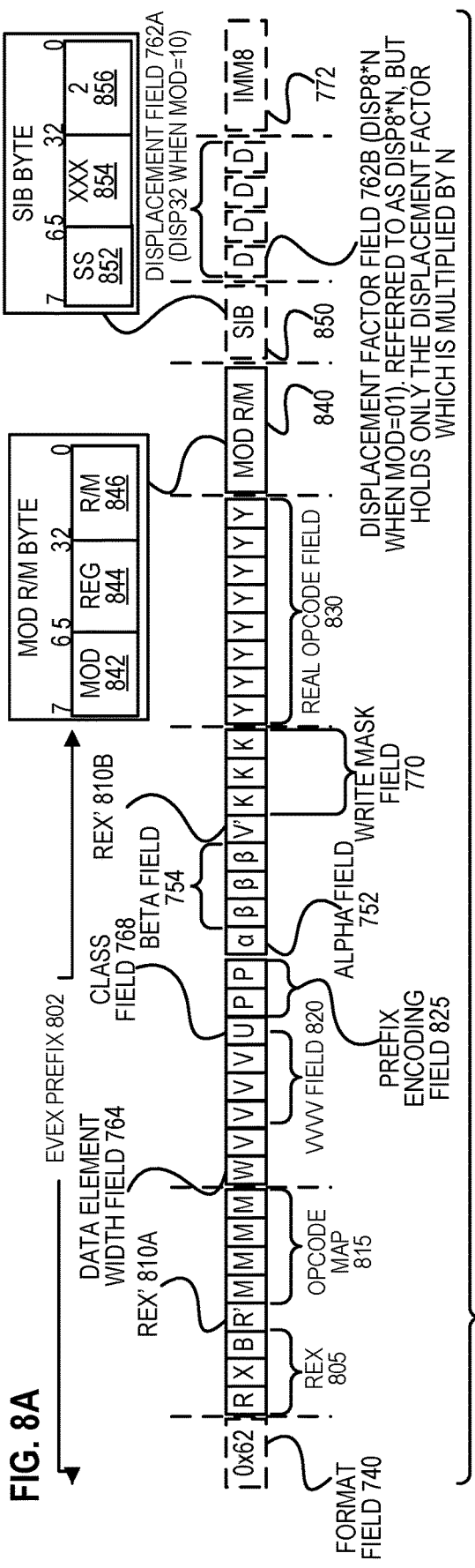
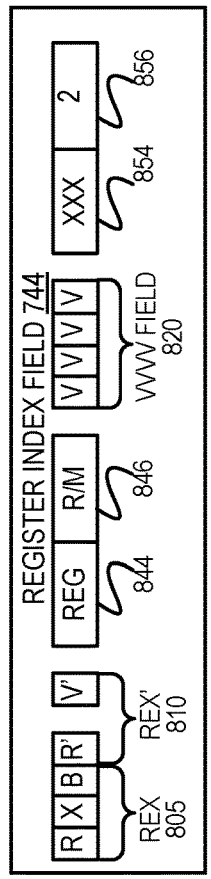
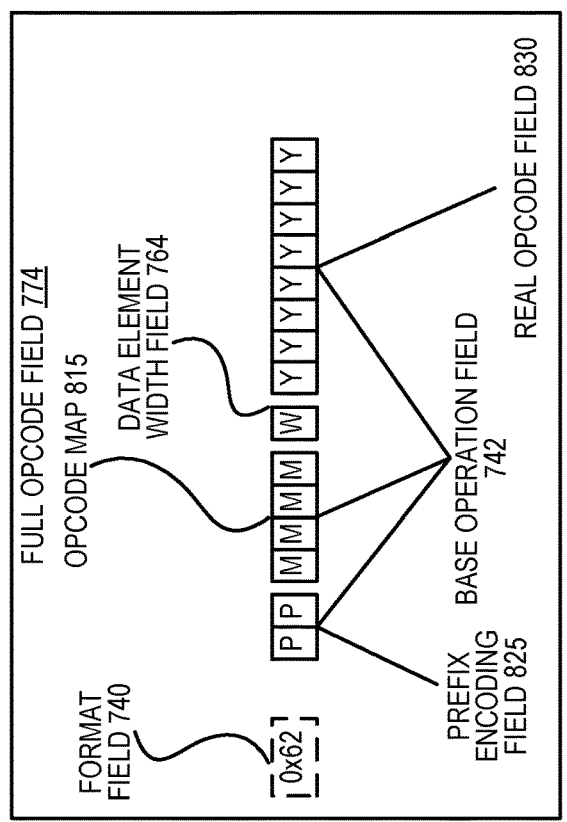
FIG. 8A
FIG. 8C
FIG. 8B

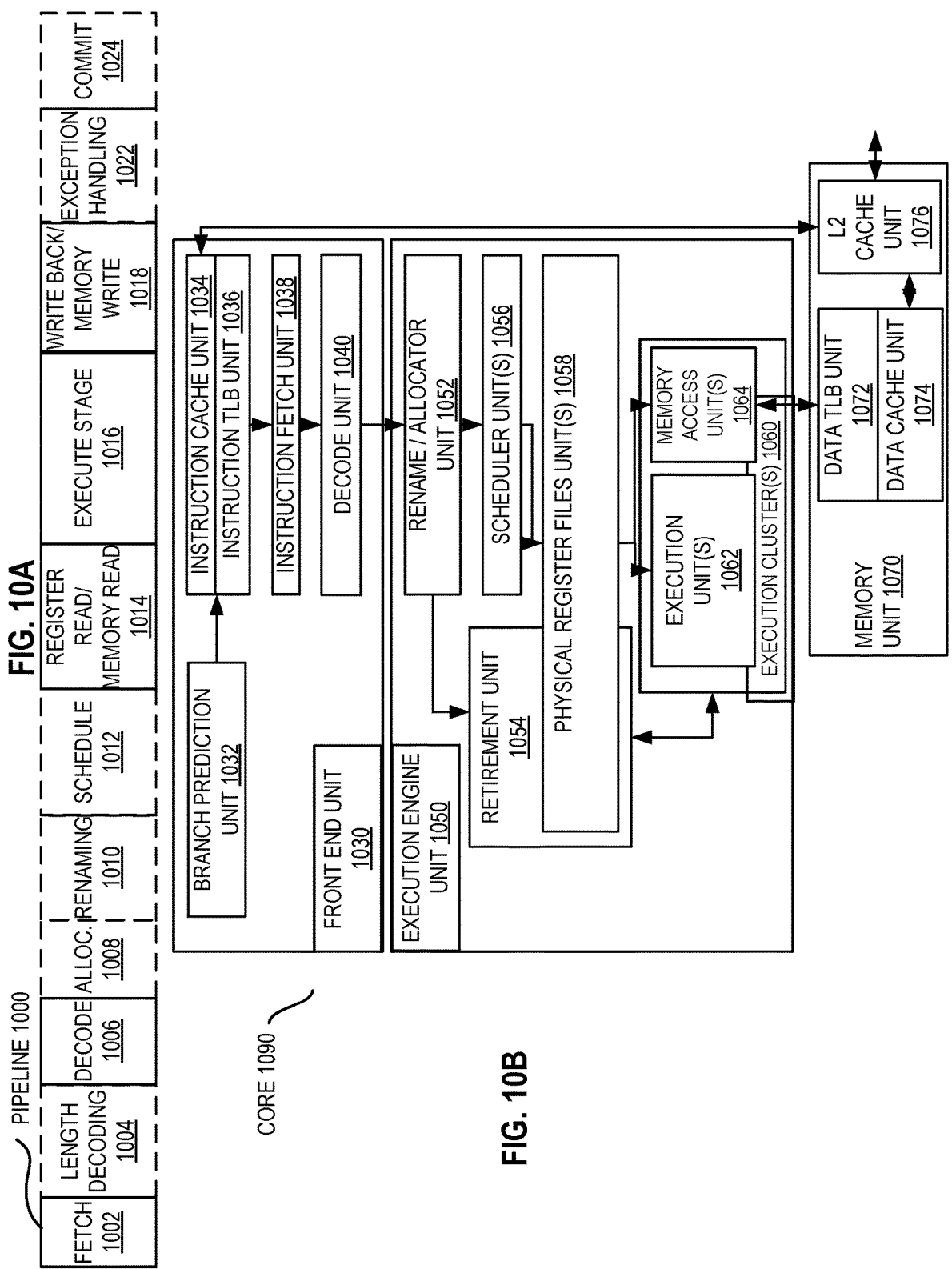

FLEXIBLE CACHE ALLOCATION TECHNOLOGY PRIORITY-BASED CACHE LINE EVICTION ALGORITHM

CROSS-REFERENCE TO RELATED APPLICATIONS

The present application is a continuation of U.S. patent application Ser. No. 16/696,548 filed Nov. 26, 2019, now U.S. Pat. No. 11,656,997, which is incorporated by reference herein in its entirety.

FIELD OF THE INVENTION

The field of invention relates generally to computer processor architecture, and, more specifically, to an improved flexible cache allocation technology (Flex-CAT) priority-based eviction algorithm for cache partitioning.

BACKGROUND

Multi-tenancy is a proven solution to achieve high system utilization and cost savings by space sharing. In cloud environments, multi-tenancy can be achieved by means of virtualization where each core hosts a virtual machine (VM) executing user applications. Emerging computing paradigms such as Function as a Service (FaaS) employ containerization to execute multiple independent light weight functions in containers. In a typical multitenant environment, high priority (HP) jobs coexist with low priority (LP) jobs on the same computing resource such as a multicore processor or a core. HP jobs are latency-sensitive jobs while LP jobs tend to have soft deadlines. Some HP jobs demand performance determinism in addition to low latency. Users submitting jobs enter into quality of service (QoS) service-level agreements (SLAs) with cloud service providers (CSPs) and depend on them to meet latency or performance determinism guarantees. CSPs need to meet SLAs by limiting performance variation or even degradation of QoS or HP jobs caused by other co-located LP jobs.

BRIEF DESCRIPTION OF THE DRAWINGS

The present invention is illustrated by way of example and not limitation in the figures of the accompanying drawings, in which like references indicate similar elements and in which:

FIG. 3 is an exemplary cache partitioning scheme, according to some embodiments;

FIG. 7A is a block diagram illustrating a generic vector friendly instruction format and class A instruction templates thereof according to some embodiments of the invention;

FIG. 7B is a block diagram illustrating the generic vector friendly instruction format and class B instruction templates thereof according to some embodiments of the invention;

FIG. 8A is a block diagram illustrating an exemplary specific vector friendly instruction format according to some embodiments of the invention;

FIG. 8B is a block diagram illustrating the fields of the specific vector friendly instruction format that make up the full opcode field according to one embodiment;

FIG. 8C is a block diagram illustrating the fields of the specific vector friendly instruction format that make up the register index field according to one embodiment;

FIG. 10A is a block diagram illustrating both an exemplary in-order pipeline and an exemplary register renaming, out-of-order issue/execution pipeline according to some embodiments;

FIG. 1013 is a block diagram illustrating both an exemplary embodiment of an in-order architecture core and an exemplary register renaming, out-of-order issue/execution architecture core to be included in a processor according to some embodiments;

FIG. 11A is a block diagram of a single processor core, along with its connection to the on-die interconnect network and with its local subset of the Level 2 (L2) cache, according to some embodiments;

FIG. 11B is an expanded view of part of the processor core in FIG. 11A according to some embodiments;

FIG. 13 is a block diagram of a system in accordance with some embodiments;

FIG. 14 is a block diagram of a first more specific exemplary system in accordance with some embodiment;

FIG. 15 is a block diagram of a second more specific exemplary system in accordance with some embodiments;

FIG. 16 is a block diagram of a System-on-a-Chip (SoC) in accordance with some embodiments.

DETAILED DESCRIPTION OF THE EMBODIMENTS

Figure 1:
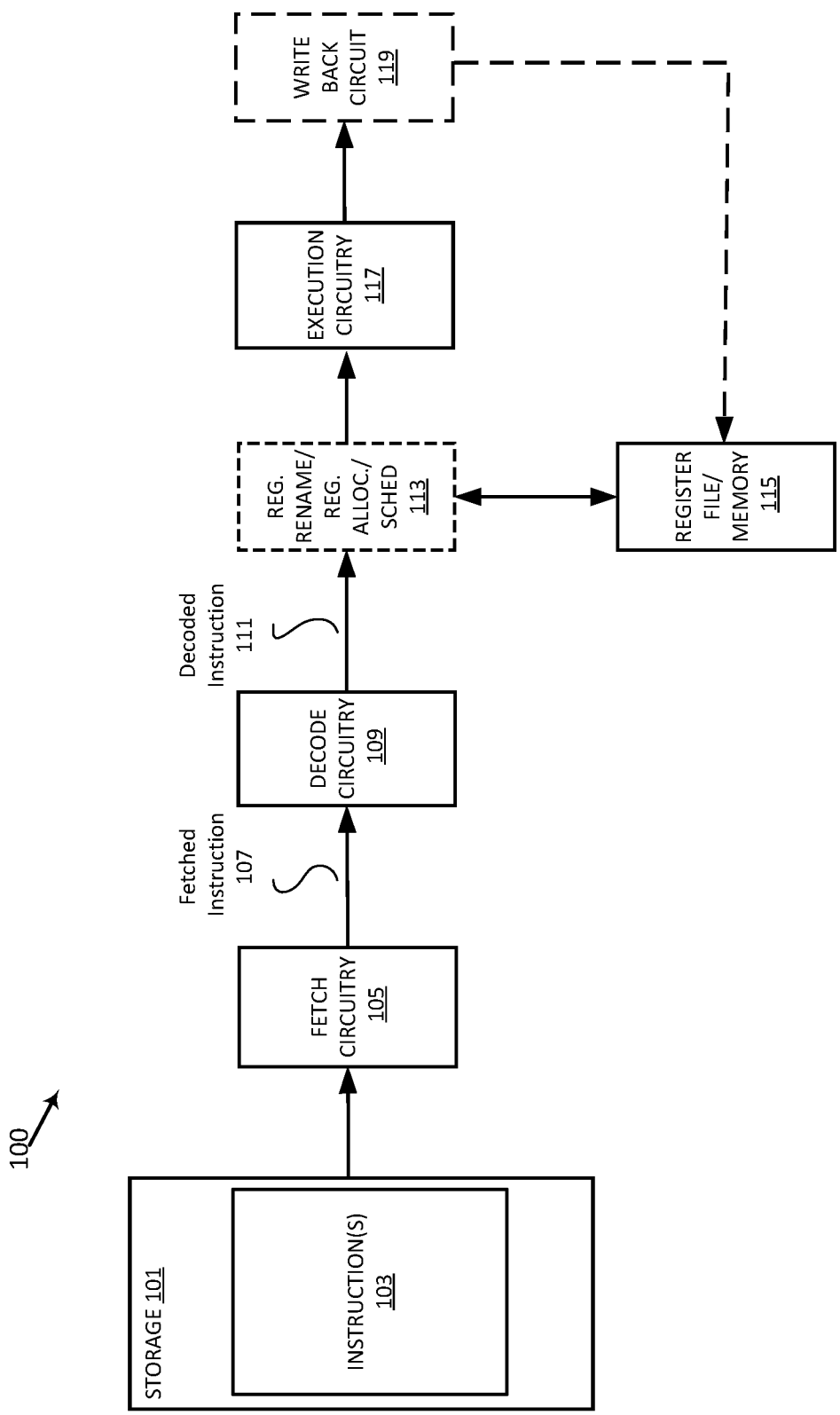
FIG. 1 is a block diagram illustrating processing components for executing instructions, according to some embodiments.

In the following description, numerous specific details are set forth. However, it is understood that some embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

As mentioned above, cloud service providers (CSPs) need to meet service-level agreements (SLAB) by limiting performance variation and degradation of quality of service (QoS) of high-performance (HP) jobs caused by co-located low-performance (LP) jobs. In particular, disclosed embodiments describe Flexible Cache Allocation Technology (Flex-CAT), an architectural solution that limits HP last level cache (LLC) evictions caused by LP jobs. The Flex-CAT approach dynamically determines the optimal number of ways per set depending on the utilization of cache lines (CLs) in each cache set by various priorities. The bounds (minimum and maximum number of ways) are specified in model-specific registers (MSRs) that provide hints for selecting a victim for eviction at the time of LLC cache-fill.

Advantageously, Flex-CAT provides an easy-to-configure, yet flexible interface to specify cache partitions. Flex-CAT supports a dynamic cache partitioning scheme that makes priority-driven LLC eviction decisions based on real-time data to manage partitions at fine granularity. Flex-CAT helps to satisfy cloud service providers' demands for architectural features to satisfy QoS guarantees such as performance determinism and isolation between high-performance and low-performance jobs. As used herein, low-performance jobs are sometimes referred to as "noisy neighbors."

Alternative, inferior approaches have attempted to address the disparity between HP and LP jobs sharing resources by assigning disjoint sets of ways to cores, and limiting HP and LP jobs to specific cores. But such approaches suffer from several disadvantages. For example, there is no notion of priority in such mechanisms. Some such approaches isolate HP jobs from LP jobs by allocating a dedicated set of ways across all cache sets and to HP cores, but such dedicated resources, when not working on HP workloads, cannot be utilized by LP workloads. Furthermore, some such approaches saturate certain limited cache sets (say, x sets) more than others (e.g., N-x sets where N=total number of cache sets). Uniform way allocation to HP jobs driven by the saturation of these x sets can lead to overprovisioning across N-x sets, and underutilization of those N-x. Also, assigning fewer than maximum ways to cores reduces associativity which causes higher conflict misses and leads to performance degradation. Approaches that use static allocation of fixed cache ways to cores leave no room for flexibility at the time of cache evictions and fills.

Disclosed embodiments, on the other hand, provide a flexible interface to dynamically specify priorities and cache partitions. Priorities are enumerated in ascending order. Flexible cache partitions can be specified in terms of the maximum and the minimum number of ways per priority. Unlike some other approaches, flex-CAT does not require software to specify the exact cache ways allocated to each partition.

Supporting such dynamic priority and cache partition specifications are class of service (CLOS) registers that hold the following values per CLOS:

CLOS Priority P: Pn bits

Maximum number of ways occupied by priority P: mxwn bits

Minimum number of ways occupied by priority P: mnwn bits

For example, let the maximum number of priorities be 4. Therefore, Pn=log(4)=2; Let the maximum number of ways be 16. Therefore, mxwn=mnwn=log(16)=4.

| Let CLOS[0]: (0, 12, 4) and CLOS[1]: (1, 4, 1) | | | |
|---|---|---|---|
| CLOS | Priority | MaxW (mxwn bits) | MinW (mnwn bits) |
| 0 | 0 | 12 | 4 |
| 1 | 1 | 4 | 1 |

According to embodiments disclosed herein, requestor is the owner of the CL that's expected to be filled in LLC. Let requestor's priority be PF. PL is the lowest priority and PH is the highest priority in the system. Let loc be the final location for the requestor's CL determined by Flex-CAT. Requestor's occupancy O[PF] is the number of CLs occupied by the requestor in the indexed cache set.

Flex-CAT is a new eviction algorithm that performs priority-driven cache partitioning at cache-set granularity. It prioritizes LP CLs for eviction as long as requestor's occupancy is under maximum way allocation (mxw). When requestor's occupancy reaches its maximum allocation, Flex-CAT prioritizes self-evictions over other priority evictions to stay within the partition bounds. In the limited scenarios when no victims can be found in the earlier two steps, Flex-CAT picks a HP CL for eviction to find a home for the incoming cache fill. This foundational idea of Flex-CAT is depicted in FIG. 4.

Figure 4:
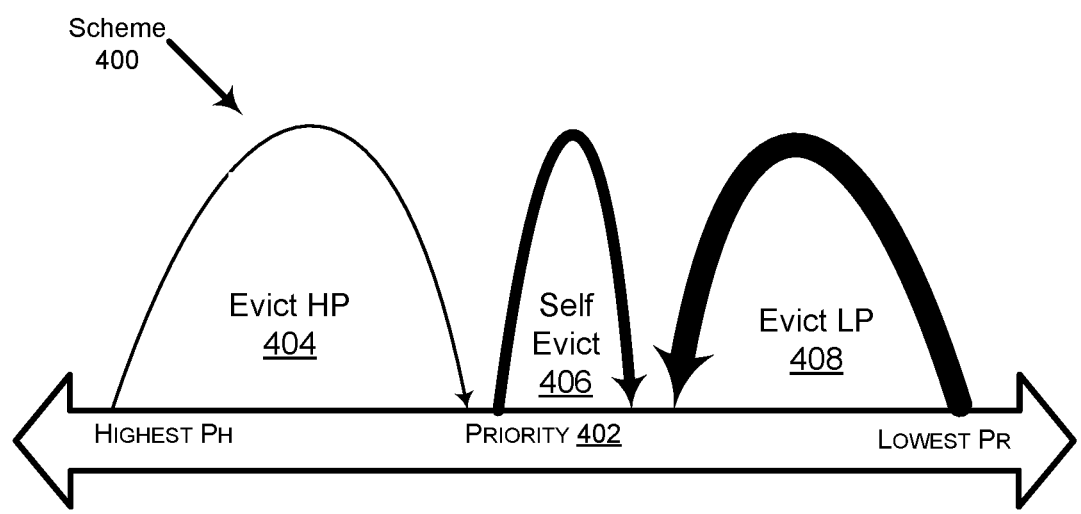
FIG. 4 is a block diagram illustrating cache line evictions, according to some embodiments.
Figure 5:
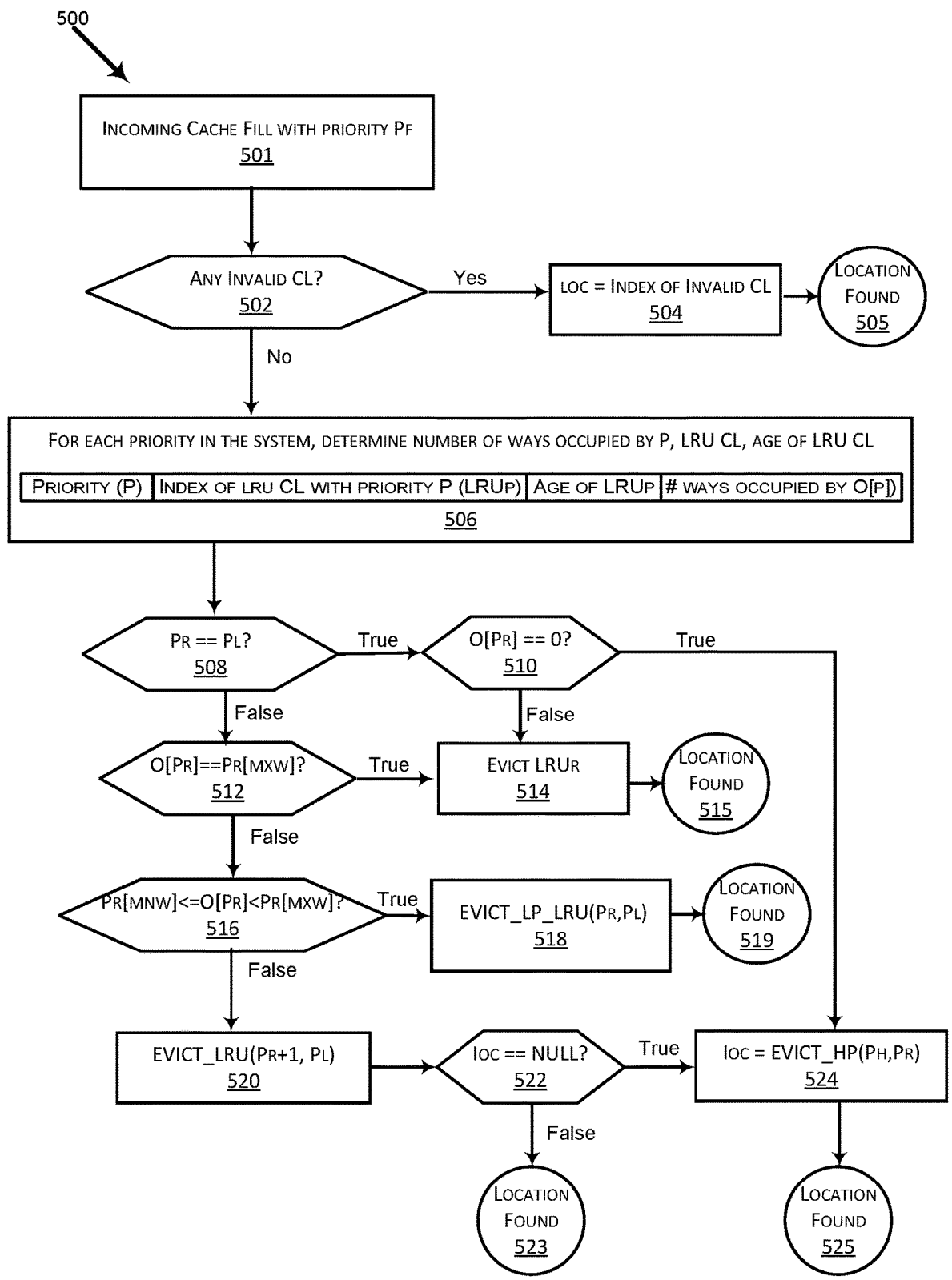
FIG. 5 is a block flow diagram illustrating a process performed by a cache control circuit in response to a cache fill request, according to some embodiments.
Figure 6:
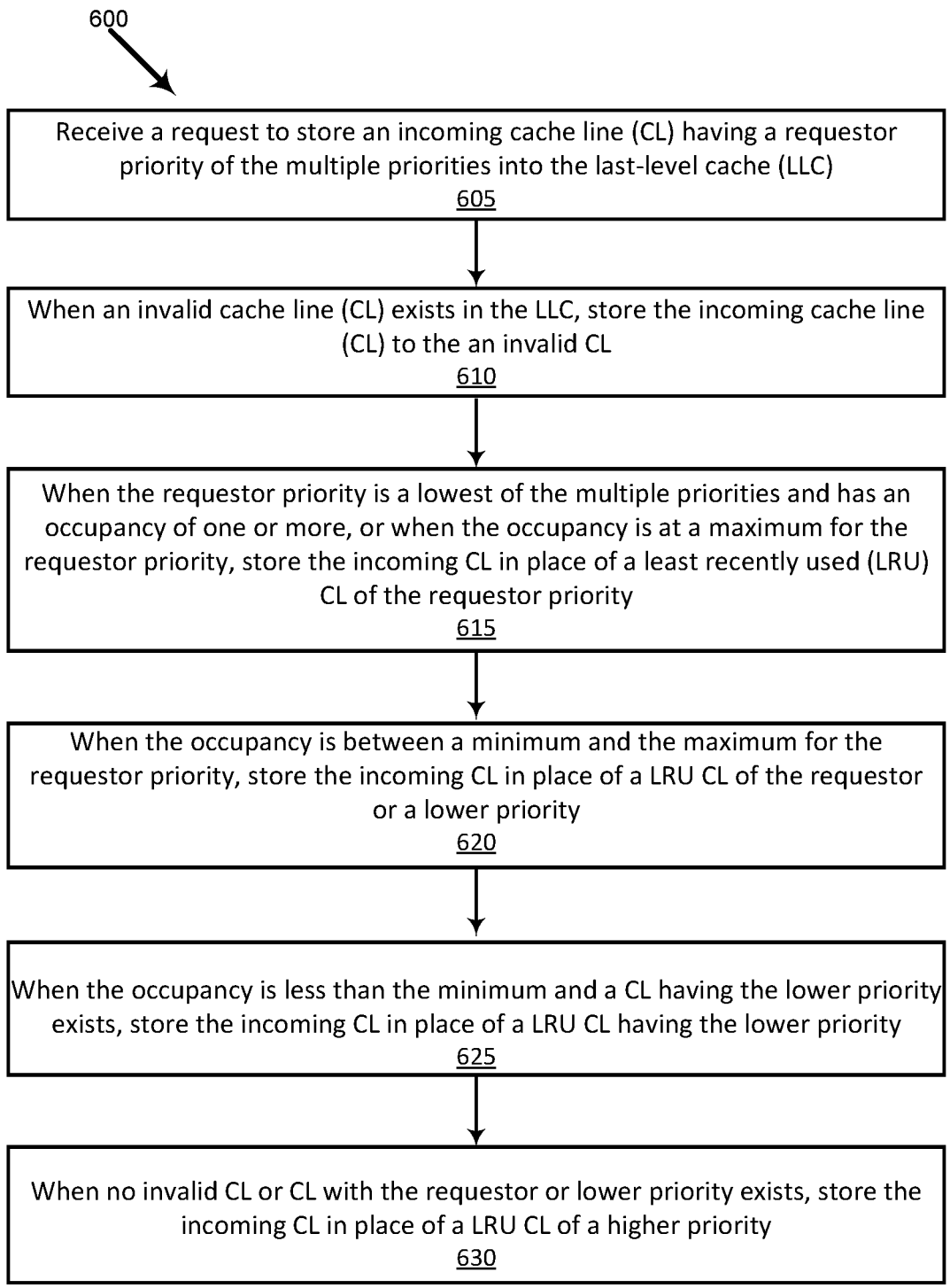
FIG. 6 is a flow diagram illustrating a cache control circuit processing a cache fill request, according to some embodiments.

The detailed algorithm is depicted in the flowcharts of FIGS. 4-6, and described below. At the time of LLC fill, disclosed embodiments rely on a conventional hashing algorithm to determine the cache set index for the requestor's incoming cache line.

After indexing into the appropriate cache set, Flex-CAT first searches for an invalid LLC entry in the indexed cache set. If the cache set if full and no invalid location is found, Flex-CAT determines a victim CL that needs to be evicted out of LLC. This ensures that Flex-CAT is only enabled for cache-sets that are saturated and no workloads are unnecessarily penalized when there is no contention. Flex-CAT scans the entire cache set and determines the LRU CL's index, its age, and the occupancy for each priority in the system.

When requestor's occupancy is under minimum allocation (O[PF]<PF[mnw]), Flex-CAT prioritizes LP LRU CLs for eviction to increase its occupancy. When requestor's occupancy reaches minimum allocation but is still under maximum allocation (PF[mnw]O[PF]<PF[mxw]), Flex-CAT also adds its LRU CL to the list of candidates while searching for LRU victim across priorities. Once requestor's occupancy reaches the maximum allocation, Flex-CAT ignores LP LRU candidates and selects requestor's LRU (LRUF) as the victim CL to ensure that the requestor's occupancy never violates the upper bound (PF[mxw]). If no victims are found in the earlier steps (when all the lines belong to higher priority owners), Flex-CAT resorts to HP evictions.

The steps followed by Flex-CAT after indexing into correct cache set are depicted in the flowchart described below and illustrated in FIGS. 5 and 6.

FIG. 1 is a block diagram illustrating processing components for executing instructions, according to some embodiments. As illustrated, storage 101 stores instruction(s) 103 to be executed. As described further below, in some embodiments, system 100 (also referred to herein as "computing system") is an SIMD processor to concurrently process multiple elements of packed-data vectors, including matrices.

In operation, the instruction(s) 103 is fetched from storage 101 by fetch circuitry 105. The instruction is decoded by decode circuitry 109. Decode circuitry 109 decodes the fetched instruction 107 into one or more operations. In some embodiments, this decoding includes generating a plurality of micro-operations to be performed by execution circuitry (such as execution circuitry 117). The decode circuitry 109 also decodes instruction suffixes and prefixes (if used).

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded instruction 111 for execution on execution circuitry 117 out of an instruction pool (e.g., using a reservation station in some embodiments).

Registers (register file) and/or memory 115 store data as operands of the instruction 111 to be operated on by execution circuitry 117. Exemplary register types include writemask registers, packed data registers, general purpose registers, and floating-point registers, as further described and illustrated below, at least with respect to FIG. 9.

In some embodiments, write back circuit 119 commits the result of the execution of the instruction. Execution circuitry 117 and system 100 are further illustrated and described with respect to FIGS. 2-4, 10A-B, and 11A-B.

Figure 2:
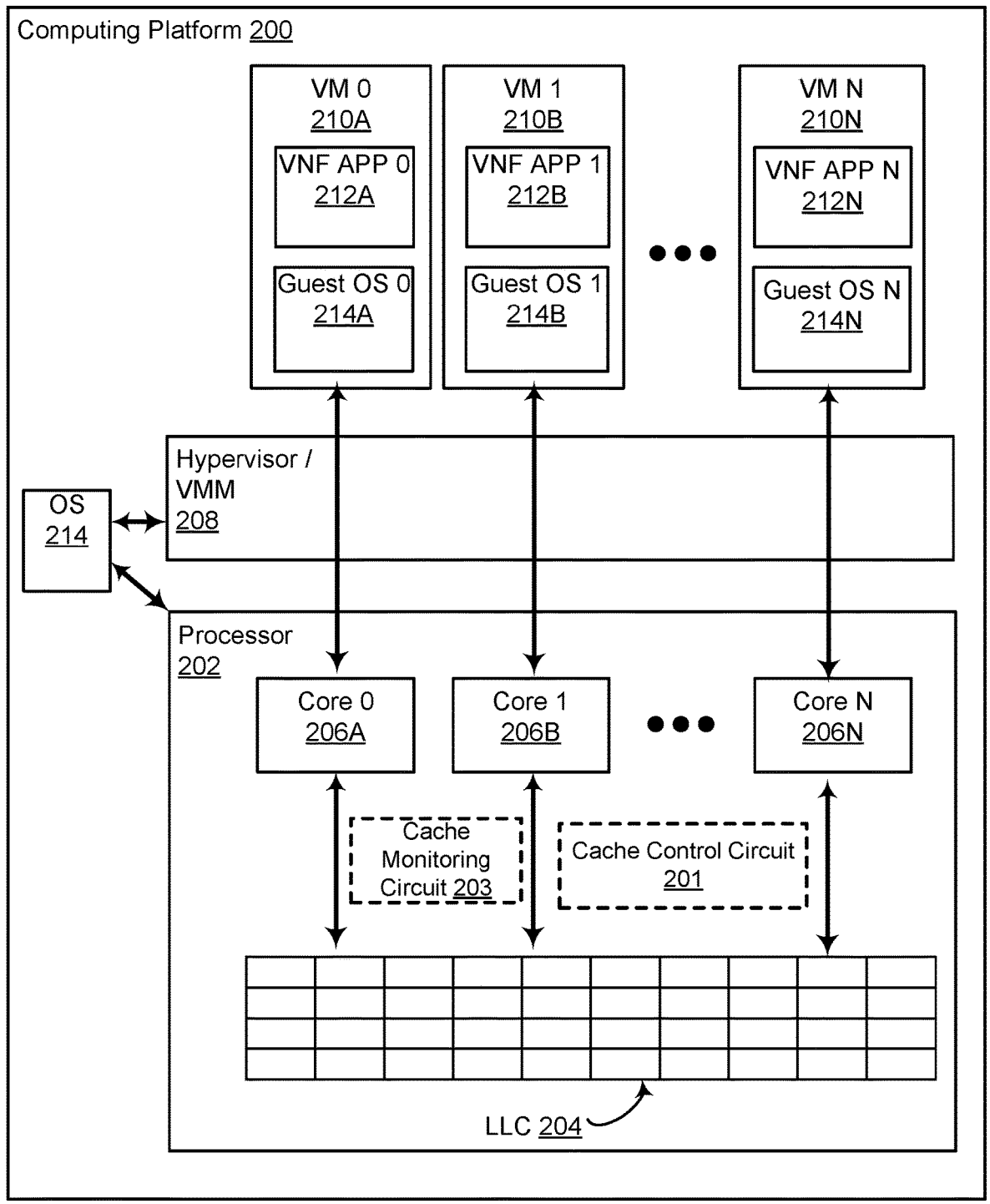
FIG. 2 is a block diagram illustrating a system including a multi-core system to execute virtual machines, according to some embodiments.

FIG. 2 is a block diagram illustrating a system including a multi-core processor to execute virtual machines, according to some embodiments. As shown, computing system 200 includes multi-core processor 202, which includes core 0 206A, core 1 206B, and up to core N 206N, and which share last level cache LLC 204. Together, the resources of processor 202 can serve as part of a computing platform of a cloud service provider (CSP) to provide network services to one or more clients. For example, as shown, cores 0, 1, to N support VM0 210A, VM1 210B, up to VMN 210N. VM0 210A supports VNF App 0 212A (virtual network function application) and guest OS 0 214A. Similarly, VM1 210B supports VNF App 1 212B, and guest OS 1 214B. Likewise, VMN 210N supports VNF App 212N and guest OS N 214N. In operation, the virtual machines are initiated and managed using hypervisor/VMM 208. Operating system 214 can also be invoked to manage the system.

In some embodiments, cache control circuit 201, working in conjunction with hypervisor/VMM 208, implements the cache partitioning schemes described herein.

In some embodiments, cache monitoring circuit 203 maintains statistics and heuristics relating to cache access requests, such as the proportion of low-priority cache fill requests result in eviction of high-priority cache lines. Cache monitoring circuit 203 is optional, as indicated by its dashed border, insofar as it could instead be incorporated in processor 202. In some examples, computing system 200 is a stand-alone computing platform, and in other examples is coupled to other computing platforms via a network (not shown).

In some embodiments, computing system 200 is a node in a datacenter to support VMs separately executing one or more VNF applications, including, for example, a cloud service provider, a database network service, a website hosting service, a routing network service, an e-mail service, a firewall service, a domain name service (DNS), a caching service, a network address translation (NAT) service, or a virus scanning network service. VMs 210A to 210N at computing system 200 may be managed or controlled by a hypervisor or virtual machine manager (VMM) such as hypervisor/VMM 208. In other embodiments, computing system 200 may be configured as a more conventional server having the various above-mentioned computing resources contained within the same physical enclosure, chassis, or container.

According to some embodiments, a virtual machine is a software computer that, like a physical computer, runs an operating system and applications. Some virtual machines are configured by a set of configuration files and are backed by the physical resources of a host. Also, a hypervisor or VMM is computer software, firmware or hardware that creates and manages virtual machines. A computer on which a hypervisor runs one or more virtual machines is called a host machine, and each virtual machine is called a guest machine. The hypervisor or VMM presents the guest operating systems with a virtual operating platform and manages the execution of the guest operating systems. Multiple instances of a variety of operating systems may share the virtualized hardware resources: for example, Linux®, Windows®, and macOS® instances can all run on a single physical processor with multiple cores.

In some examples, as shown in FIG. 2, at least some of the computing resources for computing system 200 may include processing elements such as CPU/cores 206A, 206B, to 206N having a shared last-level cache (LLC) 204.

LLC 204, in some examples, is external to processor 202. According to some examples, shared LLC 204 may be types of relatively fast access memory to serve as a shared LLC for CPUs/cores 206A to 206N to minimize access latency. The types of relatively fast access memory included in shared LLC 204 may include, but are not limited to, volatile or non-volatile types of memory. Volatile types of memory can include, without limitation, static random access memory (SRAM) or dynamic random access memory (DRAM), thyristor RAM (TRAM) or zero-capacitor RAM (ZRAM). Non-volatile types of memory can include, without limitation, byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto resistive random access memory (MRAM) that incorporates memristor technology, spin transfer torque MRAM (STT-MRAM), or a combination of any of the above.

FIG. 3 illustrates exemplary LLC cache partitioning schemes, according to some embodiments. As shown, scheme 300 is one example of a scheme that can be used as shared LLC 204 of computing system 200, as shown in FIG. 2. Here, LLC 304 is shown as an 8-way set associative cache, with each of the cache ways 302 containing 8 cache lines. Some cache lines of LLC 304 have been allocated to low-priority apps 306, some have been allocated to high-priority apps 310, and some are invalid 308. For ease of discussion, shared LLC 354 is shown as an 8-way set associative cache, with each of the ways containing 1 cache line. Some cache lines of LLC 354 have been allocated to low-priority apps 356, some have been allocated to high-priority apps 360, and some are invalid 358. The illustrations of FIG. 3 are not intended to limit disclosed embodiments to any particular geometry; other schemes may include more or fewer sets, more or fewer ways within the sets, more or fewer cache lines within each way, and so on. For example, LLC 204 can be a N-way set associative cache with each of the sets having M cache line, where N and M are positive integers starting a 1.

In operation, as further described below, the LLC 204 is to be dynamically repartitioned according to the needs of the applications sharing the LLC. Advantageously, disclosed embodiments seek to minimize the occurrence of a cache line allocated to a high-priority app from being evicted by a low-priority app.

FIG. 4 is a block diagram illustrating cache line evictions according to some embodiments of the Flex-CAT algorithm. According to disclosed embodiments, Flex-CAT is an eviction algorithm that performs priority-driven cache partitioning at cache-set granularity. As shown, scheme 400 shows applications whose priorities fall somewhere along a range of priorities 402. Arcs 404, 406, and 408 illustrate cache line evictions making room for a request to fill a cache line with an incoming cache line from a requestor core. Some evictions, such as eviction 408, evict lower priority allocation to make room for a higher-priority allocation. Some evictions are self-evictions, illustrated as arc 406 (e.g., a priority which has already allocated a maximum number of ways self-evicts to make room for an incoming CL). When requestor's occupancy reaches its maximum allocation, Flex-CAT prioritizes self-evictions over other priority evictions to stay within the partition bounds. In the limited scenarios when no victims can be found in the earlier two steps, Flex-CAT picks a HP CL for eviction to find a home for the incoming cache fill. Flex-CAT seeks to maximize eviction of LP CLs, such as eviction 408, and minimize eviction of HP CLs, such as eviction 404.

FIG. 5 is a block flow diagram illustrating a process performed by a cache control circuit in response to a cache fill request, according to some embodiments. For example, flow 500 can be performed by cache control circuit (CCC) 201 of FIG. 2. As shown, flow 500 begins at 501 where the CCC is to receive, from a requestor, an incoming cache fill request with a requestor priority. For example, the requestor can be one of the cores 206A, 206B, up to 206N of FIG. 2, and an incoming cache line can be one retrieved from memory, such as memory 115 of FIG. 1. The requestor priority can reflect the priority assigned to the application running in the requesting core. At operation 502, the CCC is to determine whether there are any invalid cache lines (CLs) in the LLC. If so, at operation 504, the CCC is to write the incoming CL to the location of the invalid cache line, and, at 505, the location having been found, the flow ends. But if operation 502 indicates no invalid CLs exist, the CCC at 506 is to, for each priority in the system, determine the priority (P), the index of the LRU CL with priority P (LRUp), the age of the LRUp, and, the number of ways occupied by the priority. At operation 508, the CCC is to determine whether the requestor priority ($P_R$) is the lowest priority. If so, the CCC is to determine at operation 510 whether the occupancy of the requestor priority ($O[P_R]$) is equal to zero, and, if so, the flow transitions to operation 524, during which a higher priority CL ($P_H$) is to be evicted to make room for the incoming CL ($P_R$).

Operation 524 represents a scenario of a high-priority cache line being evicted to make room for a lower-priority cache line, a scenario which disclosed embodiments seek to minimize except in the above mentioned case. In some embodiments, cache monitoring circuitry, such as cache monitoring circuit 203 of FIG. 2, maintains heuristics tracking responses to cache fill requests, including instances of operation 524. In some embodiments, the CCC monitors the heuristics and, if necessary, dynamically adjusts the minimum and the maximum number of ways assigned to each priority to modulate the aggressiveness of higher-priority applications in evicting lower priority applications eventually leading to operation 524. In some embodiments, cache monitoring circuit 203 causes the LLC to be repartitioned or in some embodiments, cache monitoring circuitry, when maintained heuristics, such as occurrences of operation 524, exceed a predetermined threshold, causes the bounds on the ways associated with various priorities to be adjusted. For example, the number of ways assigned to high-priority applications can be decreased to reduce the recurrent, aggressive, and complete eviction of low priority application leading to repetitive occurrence of operation 524. But if the CCC at operation 510 determines that the requestor occupancy is other than zero, the CCC at operation 514 is to evict the least recently used CL of the requestor priority.

Returning to operation 508, if the CCC determines that the requestor priority is not the lowest priority, the CCC at operation 512 is to determine whether the occupancy of the requestor priority is at a maximum, in which case the CCC at operation 514 is to evict the least recently used CL of the requestor priority. At operation 515, a location has been found and the flow ends.

Returning to operation 512, if the CCC determines that the occupancy of the requestor priority is not at a maximum, the CCC determines at operation 516 whether the occupancy of the requestor priority is less than the maximum and greater than or equal to the minimum for the requestor priority, and, if so, the flow transitions to operation 518, but if not, the flow transitions to flow 520. The CCC at operation 518 is to evict a LRU CL having a priority equal to the requestor priority ($P_R$) or lower priority ($P_L$), then, at 519, a location has been found and the flow ends. At operation 520, the CCC attempts to evict a LRU CL having a lower priority than the requestor priority. If there is such a line, the location at 522 is determined to be other than NULL and the flow transitions to 523, where a location has been found and the flow ends. But if there is no such CL, the location at 522 being equal to NULL, the flow transitions to operation 524 to evict a LRU CL having a higher priority than the requestor priority. Then, a location having been found at 525, the flow ends.

FIG. 6 is a flow diagram illustrating a method performed by a cache control circuit (CCC) processing a cache fill request, according to some embodiments. For example, flow 600 can be performed by cache control circuit (CCC) 201 of FIG. 2. As shown, the CCC at operation 605 is to receive a request to store an incoming cache line (CL) having a requestor priority of the multiple priorities into the last-level cache (LLC). At operation 610, when an invalid cache line (CL) exists in the LLC, store the incoming cache line (CL) to the invalid CL. At operation 615, when the requestor priority is a lowest of the multiple priorities and has an occupancy of one or more, or when the occupancy is at a maximum for the requestor priority, store the incoming CL in place of a least recently used (LRU) CL of the requestor priority. At operation 620, when the occupancy is between a minimum and the maximum for the requestor priority, store the incoming CL in place of a LRU CL of the requestor or a lower priority. At operation 625, when the occupancy is less than the minimum and a CL having the lower priority exists, store the incoming CL in place of a LRU CL having the lower priority. At operation 630, when no invalid CL or CL with the requestor or lower priority exists, store the incoming CL in place of a LRU CL of a higher priority.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
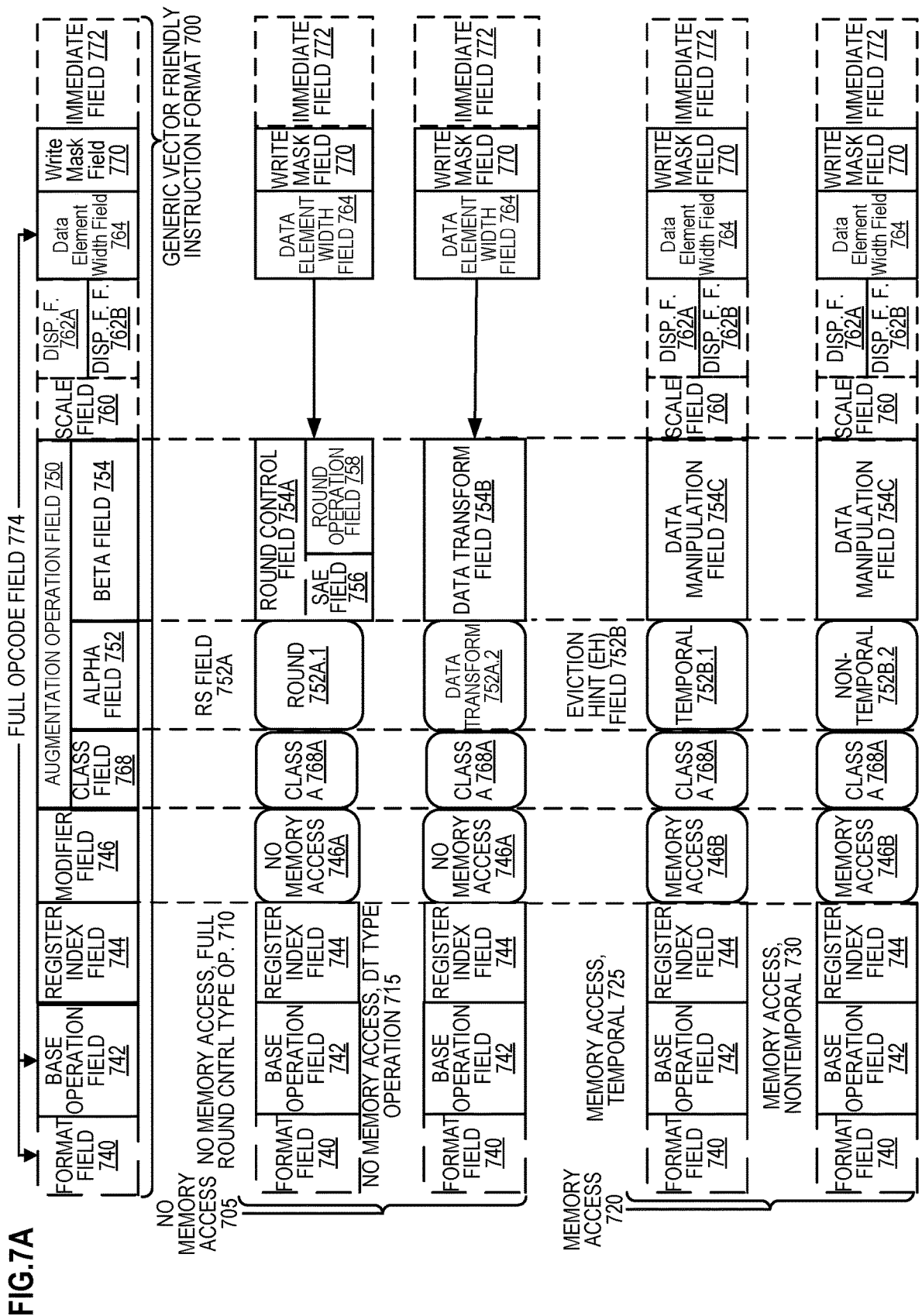
FIGS. 7A-7B are block diagrams illustrating a generic vector friendly instruction format and instruction templates thereof according to some embodiments of the invention.
Figure 7B:
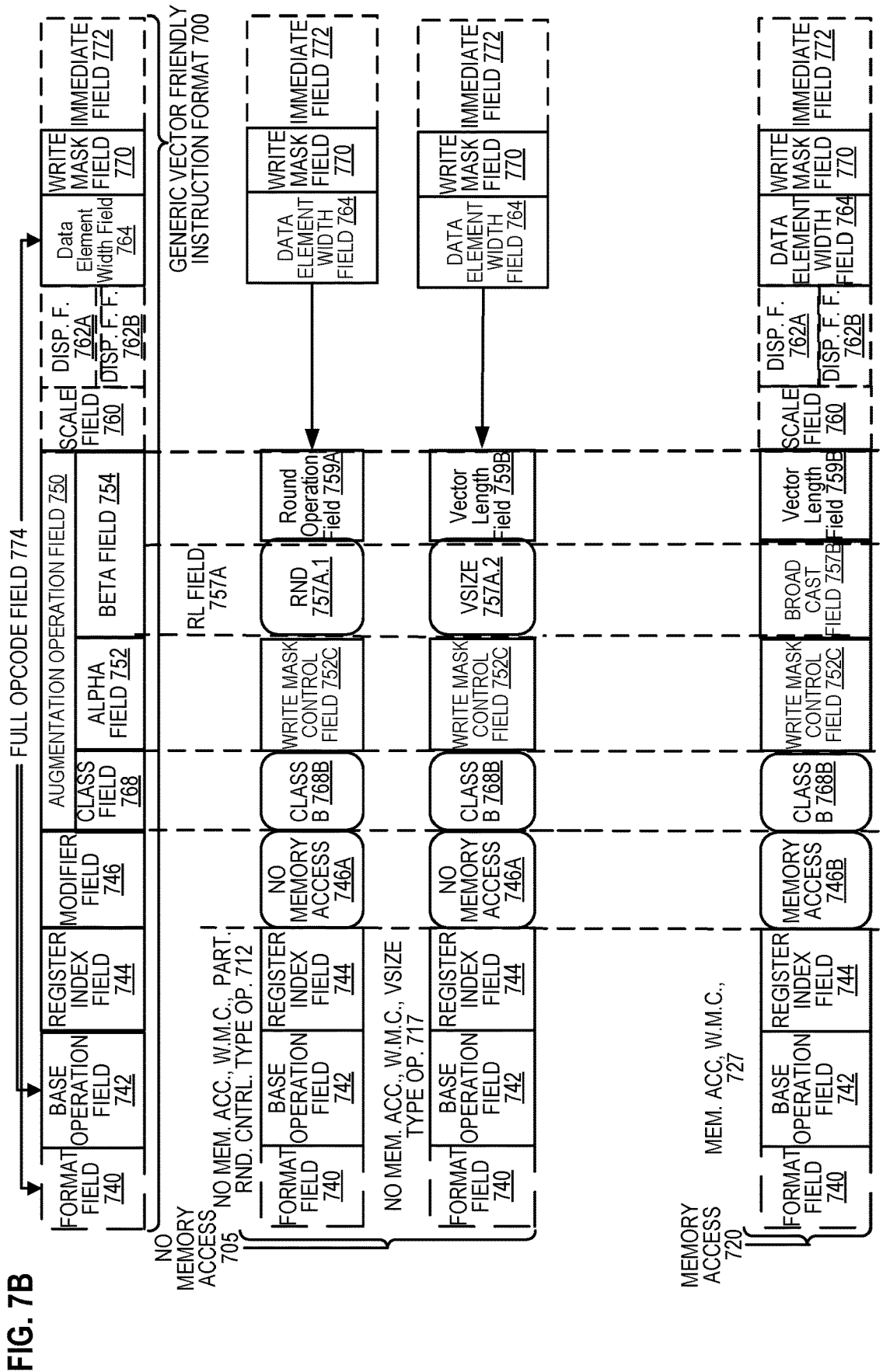

FIGS. 7A-7B are block diagrams illustrating a generic vector friendly instruction format and instruction templates thereof according to some embodiments of the invention. FIG. 7A is a block diagram illustrating a generic vector friendly instruction format and class A instruction templates thereof according to some embodiments of the invention; while FIG. 7B is a block diagram illustrating the generic vector friendly instruction format and class B instruction templates thereof according to some embodiments of the invention. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In some embodiments, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*index+base$).

Displacement Field 762A—its content is used as part of memory address generation (e.g., for address generation that uses $2^{scale}*index+base+displacement$).

Displacement Factor Field 762B (note that the juxtaposition of displacement field 762A directly over displacement factor field 762B indicates one or the other is used) —its content is used as part of address generation; it specifies a displacement factor that is to be scaled by the size of a memory access (N) —where N is the number of bytes in the memory access (e.g., for address generation that uses $2^{scale}*index+base+scaled$ displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the invention are described in which the write mask field's 770 content selects one of a number of write mask registers that contains the write mask to be used (and thus the write mask field's 770 content indirectly identifies that masking to be performed), alternative embodiments instead or additional allow the write mask field's 770 content to directly specify the masking to be performed.

Immediate field 772—its content allows for the specification of an immediate. This field is optional in the sense that it is not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement factor field 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the invention the round control field 754A includes a suppress all floating-point exceptions (SAE) field 756 and a round operation control field 758, alternative embodiments may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating-point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In some embodiments where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement factor field 762B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement factor field 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating-point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In some embodiments where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement factor field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8A is a block diagram illustrating an exemplary specific vector friendly instruction format according to some embodiments of the invention. FIG. 8A shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7A or 7B into which the fields from FIG. 8A map are illustrated.

It should be understood that, although embodiments of the invention are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

The specific vector friendly instruction format 800 includes the following fields listed below in the order illustrated in FIG. 8A.

EVEX Prefix 802 (Bytes 0-3) is encoded in a four-byte form.

Format Field 740 (EVEX Byte 0, bits [7:0]) the first byte (EVEX Byte 0) is the format field 740 and it contains 0x62 (the unique value used for distinguishing the vector friendly instruction format in some embodiments).

The second-fourth bytes (EVEX Bytes 1-3) include a number of bit fields providing specific capability.

REX field 805 (EVEX Byte 1, bits [7-5]) —consists of an EVEX.R bit field (EVEX Byte 1, bit [7]-R), EVEX.X bit field (EVEX byte 1, bit [6]-X), and EVEX.B bit field (EVEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 810A—this is the first part of the REX' field 810 and is the EVEX.R' bit field (EVEX Byte 1, bit [4] R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm) —its content encodes an implied leading opcode byte (0F, 0F 38, or 0F 3).

Data element width field 764 (EVEX byte 2, bit [7]-W) is represented by the notation EVEX.W. EVEX.W is used to define the granularity (size) of the datatype (either 32-bit data elements or 64-bit data elements).

EVEX.vvvv field 820 (EVEX Byte 2, bits [6:3]-vvvv) the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]-U) —If EVEX.U=0, it indicates class A or EVEX.U0; if EVEX.U=1, it indicates class B or EVEX.U1.

Prefix encoding field 825 (EVEX byte 2, bits [1:0]-pp) —provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]-EH; also known as EVEX.EH, EVEX.rs, EVEX.RL, EVEX.write mask control, and EVEX.N; also illustrated with α) —as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ) —as previously described, this field is context specific.

REX' 810B—this is the remainder of the REX' field 810 and is the EVEX.V' bit field (EVEX Byte 3, bit [3] V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk) —its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand or be treated as an opcode extension and not used to encode any instruction operand. The role of R/M field 846 may include the following: encoding the instruction operand that references a memory address or encoding either the destination register operand or a source register operand.

Scale, Index, Base (SIB) Byte 850 (Byte 6) includes SS 852 related to the scale. As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10) —when MOD field 842 contains 10, bytes 7-10 are the displacement field 762A, and it works the same as the legacy 32-bit displacement (disp32) and works at byte granularity.

Displacement factor field 762B (Byte 7) —when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to some embodiments. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to some embodiments. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
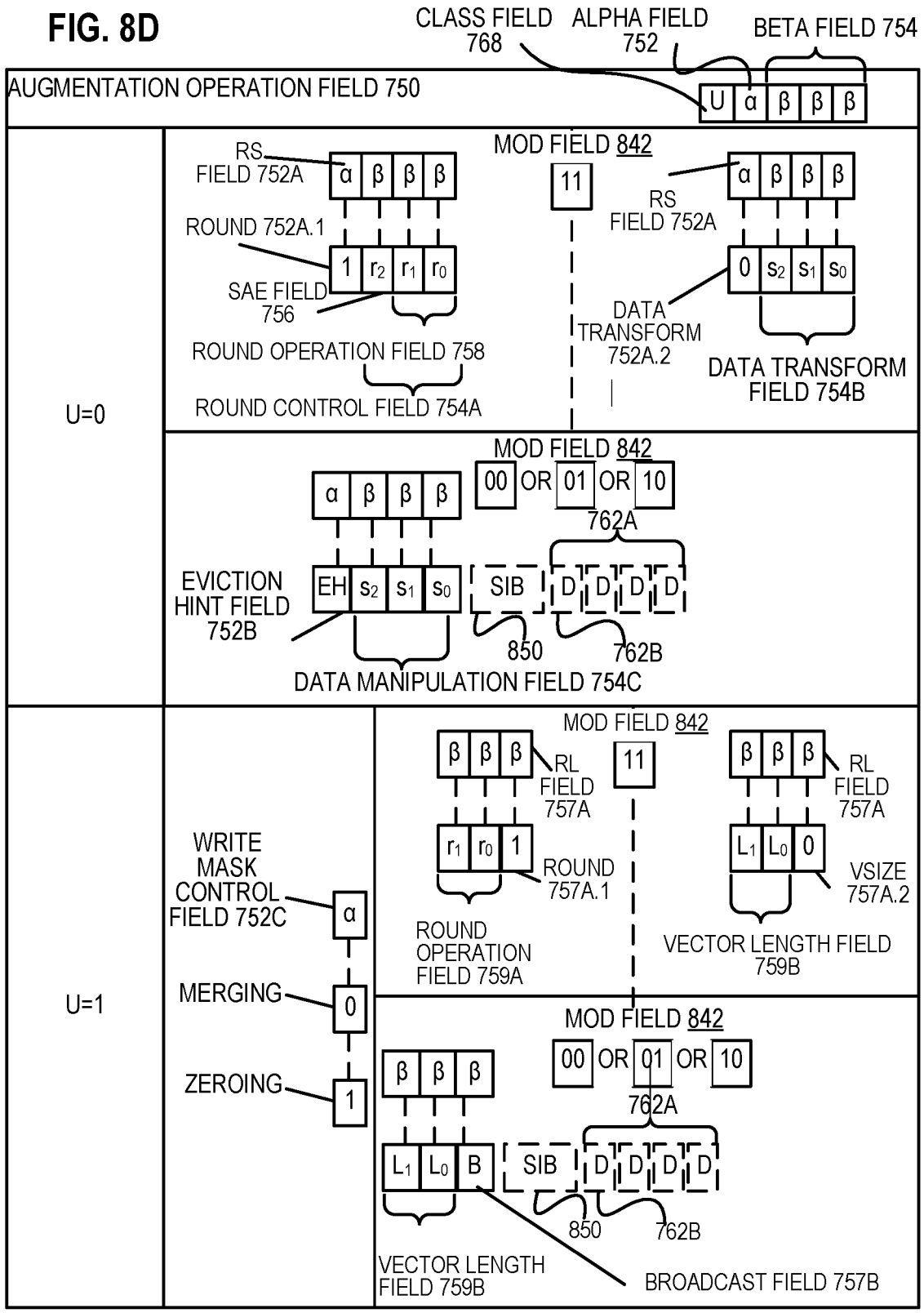
FIG. 8D is a block diagram illustrating the fields of the specific vector friendly instruction format that make up the augmentation operation field according to one embodiment.

FIG. 8D is a block diagram illustrating the fields of the specific vector friendly instruction format 800 that make up the augmentation operation field 750 according to some embodiments. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4] SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4] SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4] SSS) is interpreted as a three bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4] $S_0$) is interpreted as the RL field 757A; when it contains a 1 (round 757A.1) the rest of the beta field 754 (EVEX byte 3, bit [6-5] $S_{2-1}$) is interpreted as the round operation field 759A, while when the RL field 757A contains a 0 (VSIZE 757.A2) the rest of the beta field 754 (EVEX byte 3, bit [6-5] $S_{2-1}$) is interpreted as the vector length field 759B (EVEX byte 3, bit [6-5] $L_{1-0}$). When U=1 and the MOD field 842 contains 00, 01, or 10 (signifying a memory access operation), the beta field 754 (EVEX byte 3, bits [6:4] SSS) is interpreted as the vector length field 759B (EVEX byte 3, bit [6-5] $L_{1-0}$) and the broadcast field 757B (EVEX byte 3, bit [4] B).

Exemplary Register Architecture

Figure 9:
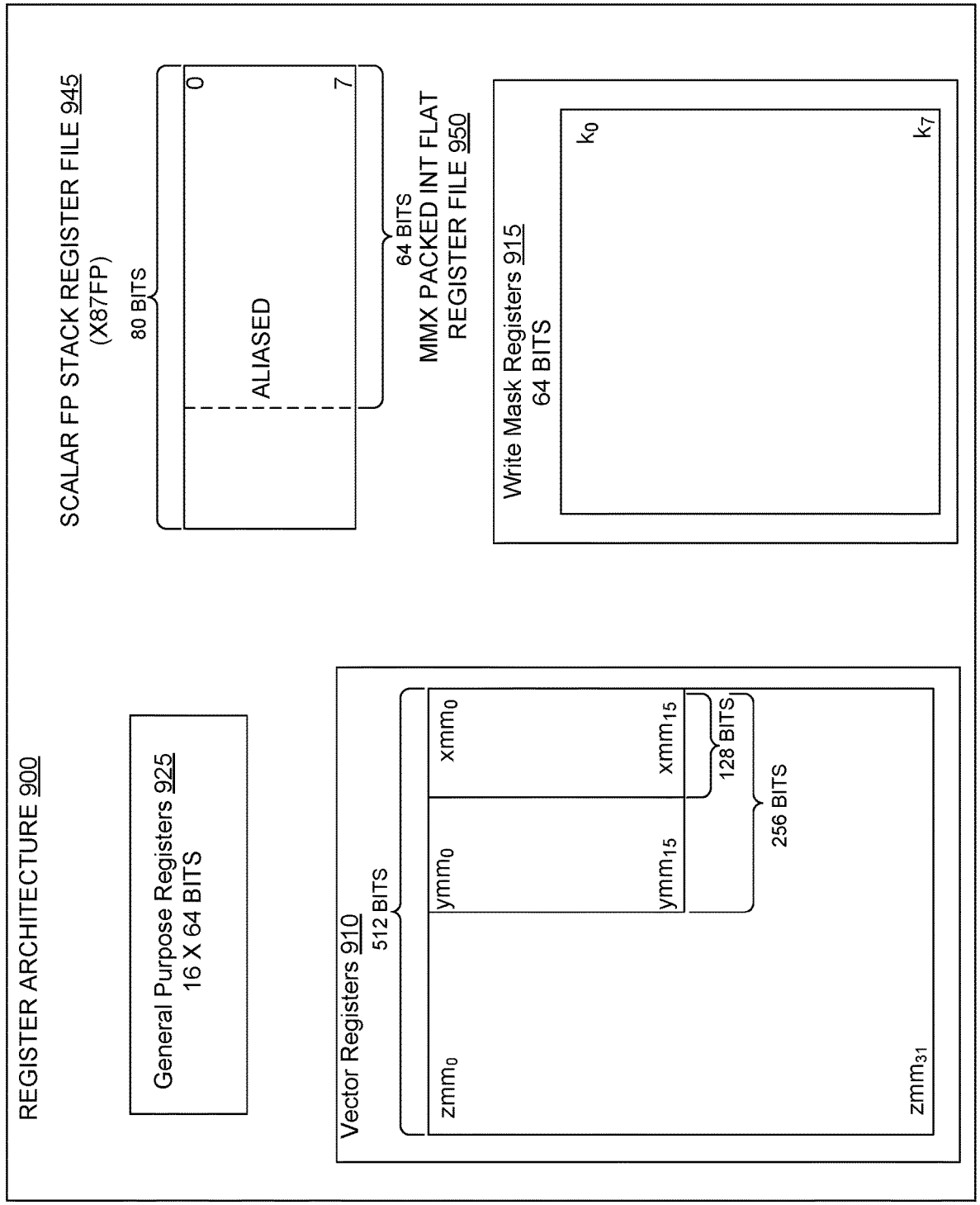
FIG. 9 is a block diagram of a register architecture according to one embodiment.

FIG. 9 is a block diagram of a register architecture 900 according to some embodiments. In the embodiment illustrated, there are 32 vector registers 910 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating-point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 915 in the embodiment illustrated, there are 8 write mask registers (k0 through k7), each 64 bits in size. In an alternate embodiment, the write mask registers 915 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 925 in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 945, on which is aliased the MMX packed integer flat register file 950 in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to some embodiments of the invention. FIG. 10B is a block diagram illustrating both an exemplary embodiment of an in-order architecture core and an exemplary register renaming, out-of-order issue/execution architecture core to be included in a processor according to some embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 1013 shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch unit 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
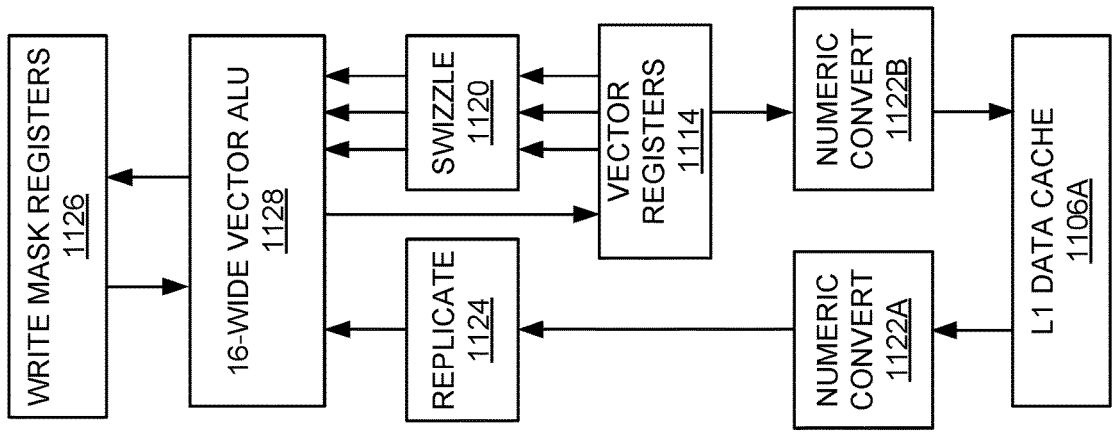
FIGS. 11A-B illustrate a block diagram of a more specific exemplary in-order core architecture, which core would be one of several logic blocks (including other cores of the same type and/or different types) in a chip.
Figure 11A:
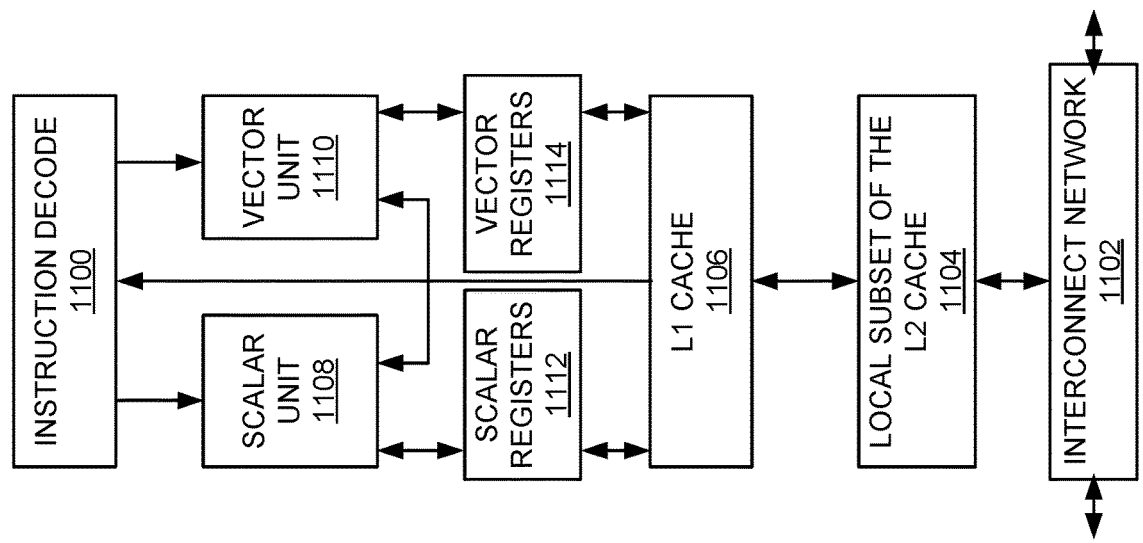

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to some embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to some embodiments of the invention. FIG. 11B includes an L1 data cache 1106A part of the L1 cache 1106, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A and 1122B, and replication with replication unit 1124 on the memory input. Write mask registers 1126 allow predicating resulting vector writes.

Figure 12:
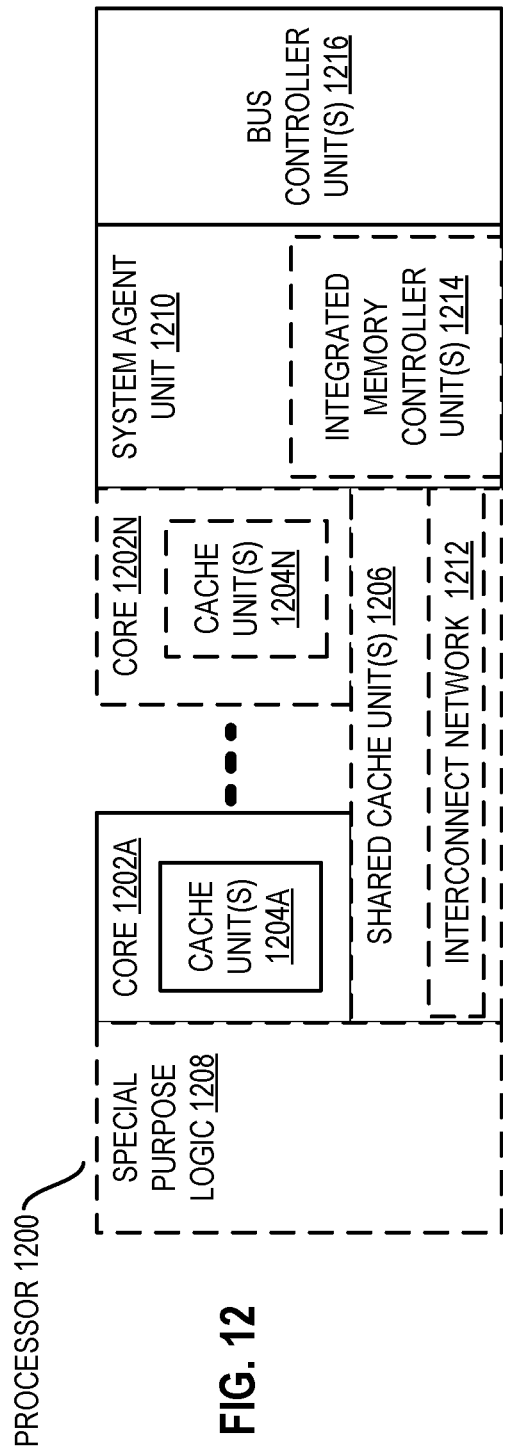
FIG. 12 is a block diagram of a processor that may have more than one core, may have an integrated memory controller, and may have integrated graphics according to some embodiments.

FIG. 12 is a block diagram of a processor 1200 that may have more than one core, may have an integrated memory controller, and may have integrated graphics according to some embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-1202N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set of one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208 (integrated graphics logic 1208 is an example of and is also referred to herein as special purpose logic), the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
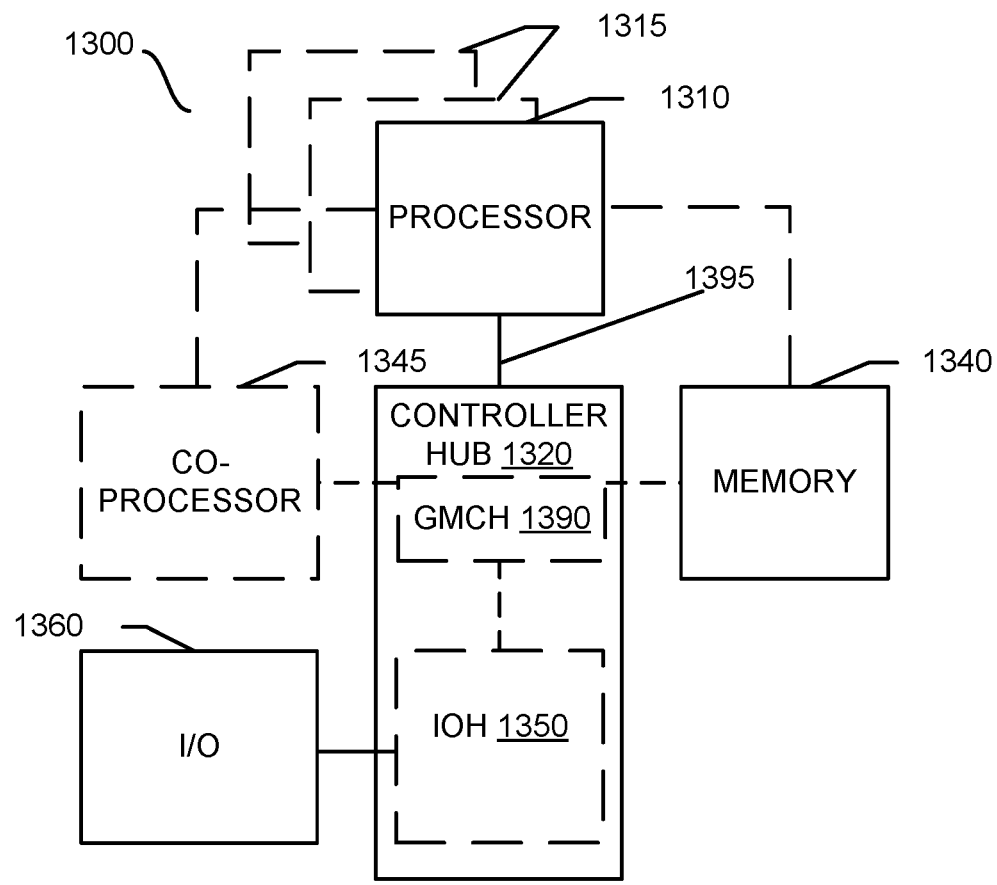
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
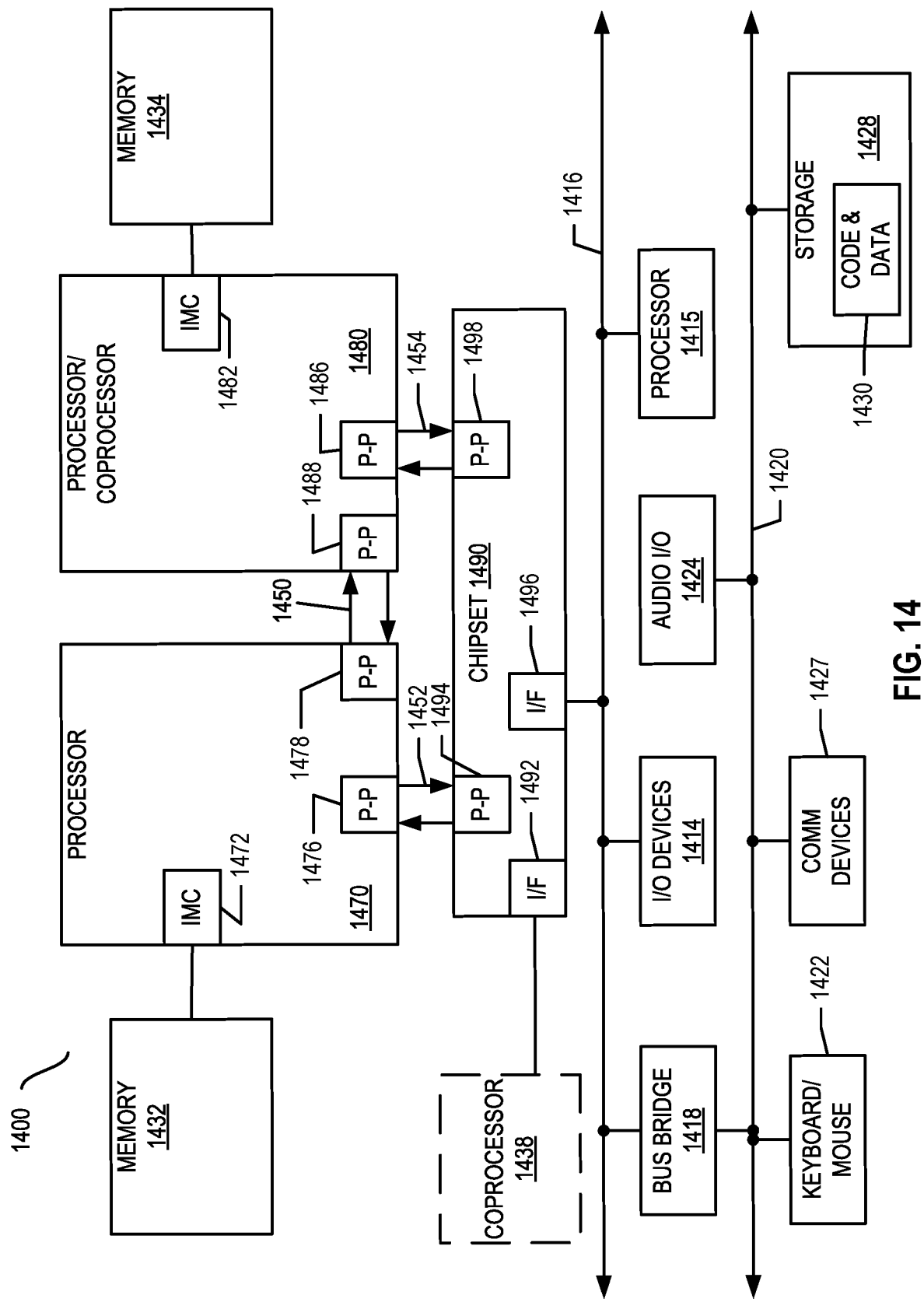

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In some embodiments, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472, and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
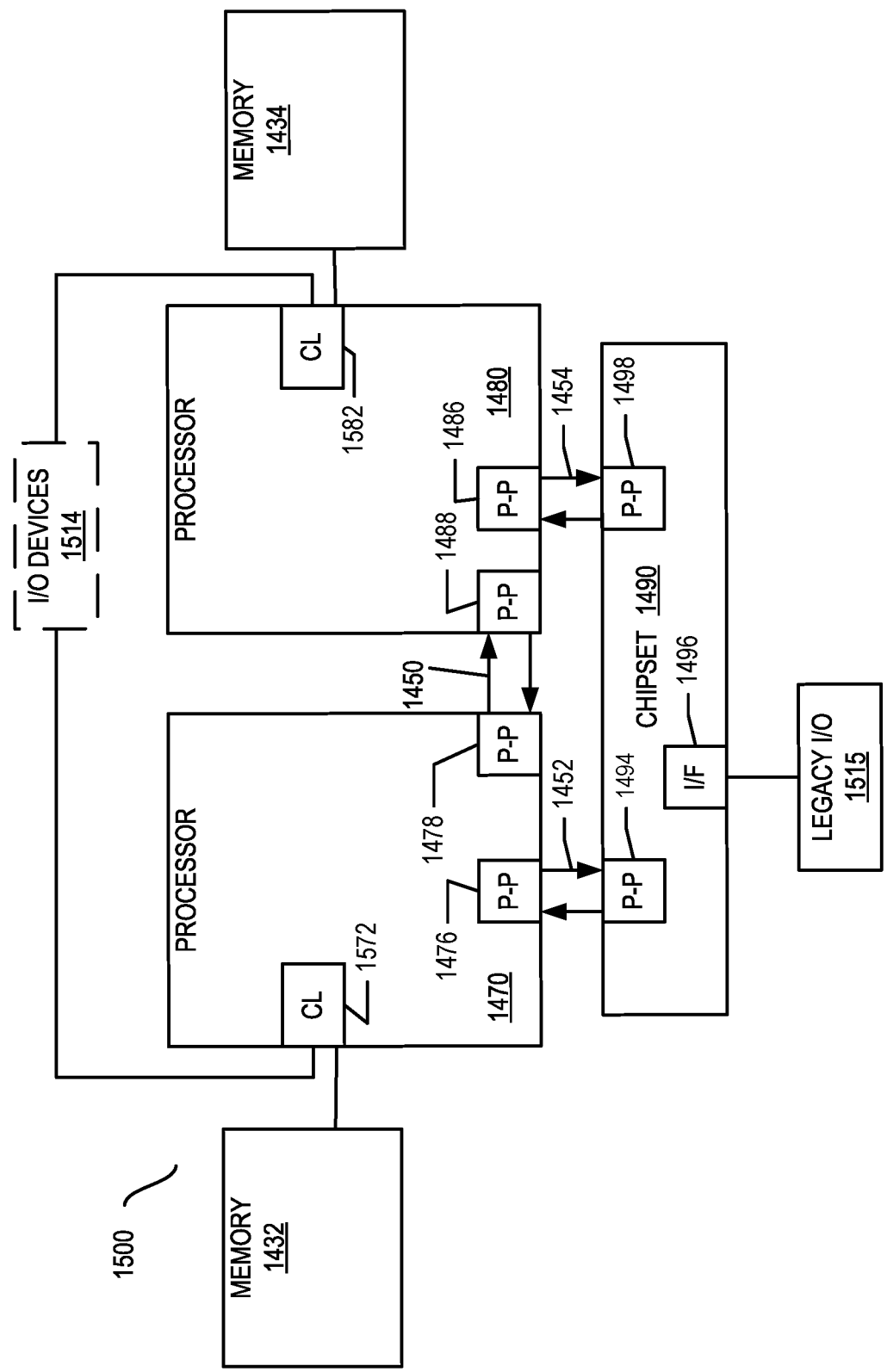

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1572 and 1582, respectively. Thus, the CL 1572, 1582 include integrated memory controller units and include I/O control logic. FIG. 15 illustrates that not only are the memories 1432, 1434 coupled to the CL 1572, 1582, but also that I/O devices 1514 are also coupled to the control logic 1572, 1582. Legacy I/O devices 1515 are coupled to the chipset 1490.

Figure 16:
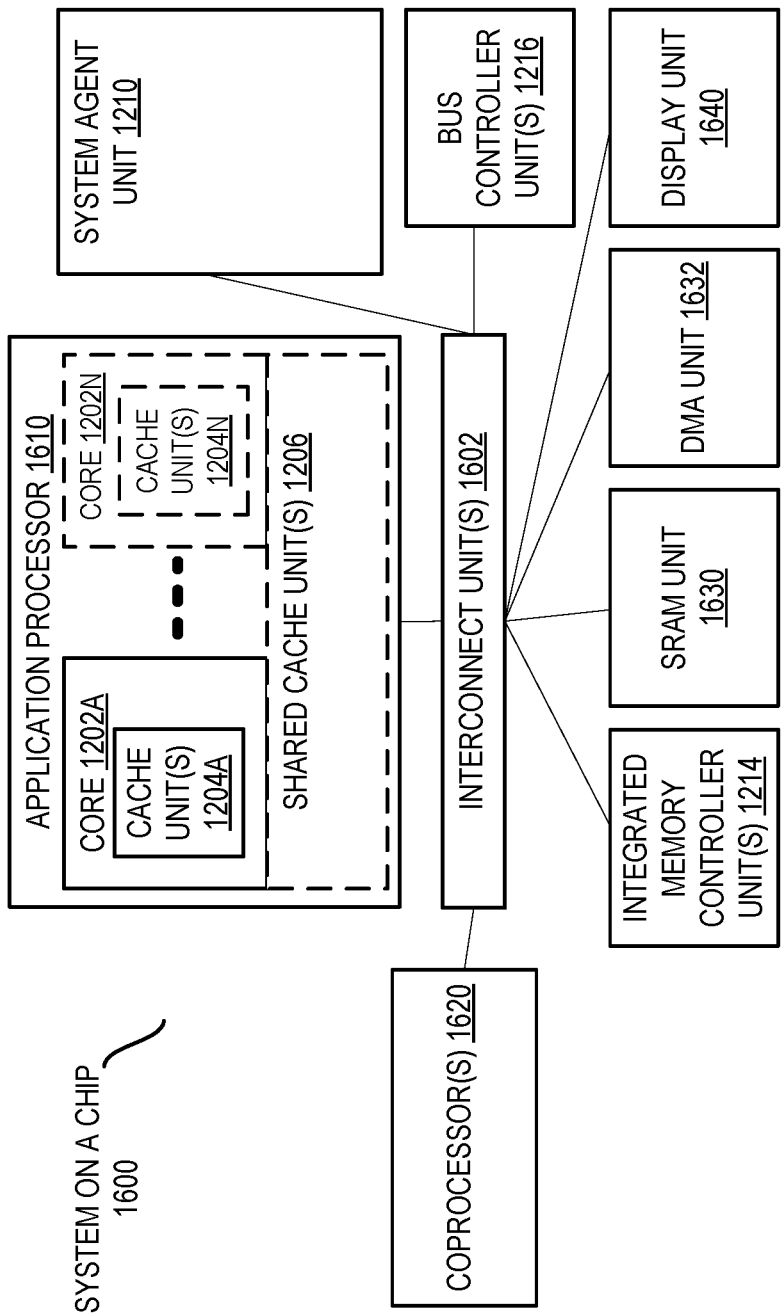

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N, which include cache units 1204A-N, and shared cache unit(s) 1206; a system agent unit 1210; a bus controller unit(s) 1216; an integrated memory controller unit(s) 1214; a set of one or more coprocessors 1620 which may include integrated graphics logic, an image processor, an audio processor, and a video processor; a static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
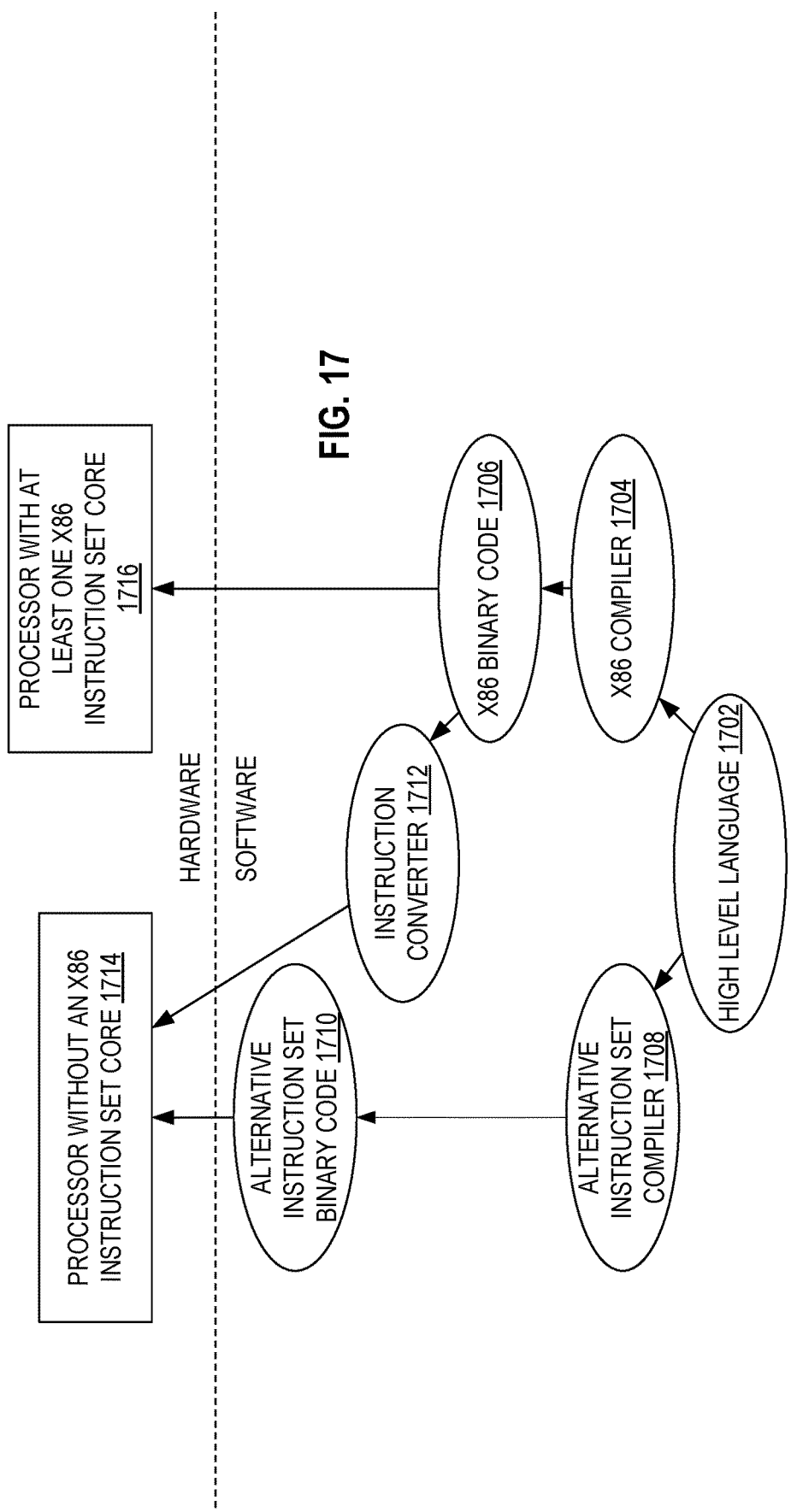
FIG. 17 is a block diagram contrasting the use of a software instruction converter to convert binary instructions in a source instruction set to binary instructions in a target instruction set according to some embodiments.

FIG. 17 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation, or any other process, allows a processor or other electronic device that does not have an x86 instruction set processor or core to execute the x86 binary code 1706.

FURTHER EXAMPLES

Example 1 includes an exemplary system comprising: a processor comprising one or more cores, a last level cache (LLC) having multiple ways, each way allocated to one of multiple priorities, each priority associated with a class of service (CLOS) register specifying minimum and maximum number of ways to occupy, a cache control circuit (CCC) to store an incoming cache line (CL) having a requestor priority of the multiple priorities, to an invalid CL, if any, in the LLC, otherwise, when the requestor priority is a lowest of the multiple priorities and has an occupancy of one or more, or when the occupancy is at a maximum for the requestor priority, the CCC is to store the incoming CL in place of a least recently used (LRU) CL of the requestor priority, otherwise, when the occupancy is between a minimum and the maximum for the requestor priority, the CCC is to store the incoming CL in place of a LRU CL of the requestor or a lower priority, otherwise, when the occupancy is less than the minimum, the CCC is to store the incoming CL in place of a LRU CL, if any, having the lower priority, otherwise, when no eviction candidates having the requestor or the lower priority exist, the CCC is to store the incoming CL in place of a LRU CL having a higher than the requestor priority.

Example 2 includes the substance of the exemplary system of Example 1, wherein the LLC comprises multiple sets of ways, wherein the plurality of ways are part of one of the multiple sets, and wherein the CCC, before determining where to store the incoming CL, is to determine, based on a hashing algorithm performed on a logical address of the incoming CL, which of the multiple sets include the incoming CL.

Example 3 includes the substance of the exemplary system of Example 1, further comprising a cache monitor circuit to maintain heuristics related to LLC cache evictions, wherein, when greater than a threshold percentage of cache lines having a high priority are evicted to make room to fill an incoming CL with a lower priority, the CLOS register for the high priority is to be updated to increase the minimum and maximum ways to occupy.

Example 4 includes the substance of the exemplary system of Example 1, wherein each of the plurality of ways comprises N CLs, wherein N is a positive integer being greater than or equal to one.

Example 5 includes the substance of the exemplary system of Example 1, wherein the CCC, when storing the incoming CL in place of the LRU CL, if any, having the lower priority, is to cause flushing of other CLs, if any, in a way containing the LRU CL.

Example 6 includes the substance of the exemplary system of Example 1, wherein the one or more cores are each to implement a virtual machine, and wherein the CCC comprises a hypervisor.

Example 7 includes the substance of the exemplary system of Example 1, wherein the processor is one of multiple processors in a data center of a cloud service provider.

Example 8 includes an exemplary method performed by a cache control circuit (CCC) in a system comprising a processor having one or more cores, a last level cache (LLC) having multiple ways, each way allocated to one of multiple priorities, each priority associated with a class of service (CLOS) register specifying minimum and maximum number of ways to occupy, the method comprising: receiving a request to store an incoming cache line (CL) having a requestor priority of the multiple priorities into the LLC, storing the incoming CL to an invalid CL in the LLC, if one exists, otherwise, when the requestor priority is a lowest of the multiple priorities and has an occupancy of one or more, or when the occupancy is at a maximum for the requestor priority, storing the incoming CL in place of a least recently used (LRU) CL of the requestor priority, otherwise, when the occupancy is between a minimum and the maximum for the requestor priority, storing the incoming CL in place of a LRU CL of the requestor or a lower priority, otherwise, when the occupancy is less than the minimum, storing the incoming CL in place of a LRU CL, if any, having the lower priority, otherwise, when no eviction candidates having the requestor or the lower priority exist, storing the incoming CL in place of a LRU CL having a higher than the requestor priority.

Example 9 includes the substance of the exemplary method of Example 8, wherein the LLC comprises multiple sets of ways, wherein the plurality of ways are part of one of the multiple sets, and wherein the CCC, before determining where to store the incoming CL, is to determine, based on a hashing algorithm performed on a logical address of the incoming CL, which of the multiple sets includes the incoming CL.

Example 10 includes the substance of the exemplary method of Example 8, maintaining, using an LLC cache monitor circuitry, heuristics related to LLC cache evictions, wherein, when greater than a threshold percentage of cache lines having a high priority are evicted to make room to fill an incoming CL with a lower priority, the updating a CLOS register for the high priority to increase the minimum and maximum ways to occupy.

Example 11 includes the substance of the exemplary method of Example 8, wherein each of the plurality of ways comprises N CLs, wherein N is a positive integer being greater than or equal to one.

Example 12 includes the substance of the exemplary method of Example 8, wherein the CCC, when storing the incoming CL in place of the LRU CL, if any, having the lower priority, is to cause flushing of other CLs, if any, in a way containing the LRU CL.

Example 13 includes the substance of the exemplary method of Example 8, wherein the one or more cores are each to implement a virtual machine, and wherein the CCC comprises a hypervisor.

Example 14 includes the substance of the exemplary method of Example 8, wherein the processor is one of multiple processors in a data center of a cloud service provider.

Example 15 includes an exemplary non-transitory computer-readable medium containing instructions to which a cache control circuit (CCC) in a system comprising a processor having one or more cores, a last level cache (LLC) having multiple ways, each way allocated to one of multiple priorities, each priority associated with a class of service (CLOS) register specifying minimum and maximum number of ways to occupy, is to respond by: when the LLC contains an invalid cache line (CL), storing an incoming CL having a requestor priority of the multiple priorities to the invalid CL, otherwise, when the requestor priority is a lowest of the multiple priorities and has an occupancy of one or more, or when the occupancy is at a maximum for the requestor priority, storing the incoming CL in place of a least recently used (LRU) CL of the requestor priority, otherwise, when the occupancy is between a minimum and the maximum for the requestor priority, storing the incoming CL in place of a LRU CL of the requestor or a lower priority, otherwise, when the occupancy is less than the minimum, storing the incoming CL in place of a LRU CL, if any, having the lower priority, otherwise, when no eviction candidates having the requestor or the lower priority exist, storing the incoming CL in place of a LRU CL having a higher than the requestor priority.

Example 16 includes the substance of the exemplary non-transitory computer-readable medium of Example 15, wherein the LLC comprises multiple sets of ways, wherein the plurality of ways are part of one of the multiple sets, and wherein the CCC, in further response to the instructions, is to, before determining where to store the incoming CL, is to determine, based on a hashing algorithm performed on a logical address of the incoming CL, which of the multiple sets include the incoming CL.

Example 17 includes the substance of the exemplary non-transitory computer-readable medium of Example 15, wherein the processor is one of multiple processors in a data center of a cloud service provider.

Example 18 includes the substance of the exemplary non-transitory computer-readable medium of Example 15, wherein each of the plurality of ways comprises N CLs, wherein N is a positive integer being greater than or equal to one.

Example 19 includes the substance of the exemplary non-transitory computer-readable medium of Example 15, wherein the CCC, when storing the incoming CL in place of the LRU CL, if any, having the lower priority, is to cause flushing of other CLs, if any, in a way containing the LRU CL.

Example 20 includes the substance of the exemplary non-transitory computer-readable medium of Example 15, wherein the one or more cores are each to implement a virtual machine, and wherein the CCC comprises a hypervisor.

What is claimed is:

1. A processor comprising:
a plurality of cores;
an N-way set associative cache where N is an integer greater than one; and
a cache control circuit coupled with the N-way set associative cache, the cache control circuit to:
receive a cache fill request for an incoming cache line corresponding to an application;
select a victim cache line in the N-way set associative cache based at least in part on a maximum occupancy bound specified for the application and a current occupancy in the N-way set associative cache for the application, wherein the maximum occupancy bound corresponds to a maximum number of ways per set to be used by the application, and wherein the current occupancy is a number of ways currently used by the application in a set indexed by the incoming cache line; and
store the incoming cache line to a location of the selected victim cache line.

2. The processor of claim 1, wherein, if the current occupancy is at or above the maximum occupancy bound, the cache control circuit is to select a cache line currently used by the application in the set indexed by the incoming cache line, as the victim cache line.

3. The processor of claim 1, wherein the cache control circuit is to select the victim cache line based at least in part on a minimum occupancy bound specified for the application.

4. The processor of claim 3, wherein, if the current occupancy is less than the minimum occupancy bound, the cache control circuit is to select a cache line having a priority lower than a priority corresponding to the application in the set indexed by the incoming cache line, as the victim cache line.

5. The processor of claim 3, wherein the minimum occupancy bound is to be specified in a register.

6. The processor of claim 1, wherein, to select the victim cache line, the cache control circuit is to dynamically select a way based at least in part on the current occupancy.

7. The processor of claim 1, wherein, if an invalid cache line exists in the set indexed by the incoming cache line, the cache control circuit is to select the invalid cache line as the victim cache line.

8. The processor of claim 1, further comprising a cache monitor circuit to monitor use of the N-way set associative cache.

9. The processor of claim 8, wherein the cache monitor circuit is to adjust the maximum occupancy bound.

10. An apparatus comprising:
a memory controller; and
a processor coupled with the memory controller, the processor comprising:
a plurality of cores;
a N-way set associative cache where N is an integer greater than one; and
a cache control circuit coupled with the N-way set associative cache, the cache control circuit to:
receive a cache fill request for an incoming cache line corresponding to an application;
select a victim cache line in the N-way set associative cache based at least in part on a maximum occupancy bound specified for the application and a current occupancy in the N-way set associative cache for the application, wherein the maximum occupancy bound corresponds to a maximum number of ways per set to be used by the application, and wherein the current occupancy is a number of ways currently used by the application in a set indexed by the incoming cache line; and
store the incoming cache line to a location of the selected victim cache line.

11. The apparatus of claim 10, further comprising a graphics processing unit coupled with the processor, and wherein, if the current occupancy is at or above the maximum occupancy bound, the cache control circuit is to select a cache line currently used by the application in the set indexed by the incoming cache line, as the victim cache line.

12. The apparatus of claim 10, further comprising a coprocessor coupled with the processor, and wherein the cache control circuit is to select the victim cache line based at least in part on a minimum occupancy bound specified for the application.

13. The apparatus of claim 12, further comprising a display unit coupled with the processor, and wherein, if the current occupancy is less than the minimum occupancy bound, the cache control circuit is to select a cache line having a priority lower than a priority corresponding to the application in the set indexed by the incoming cache line, as the victim cache line.

14. The apparatus of claim 10, further comprising an image processor coupled with the processor, and wherein, to select the victim cache line, the cache control circuit is to dynamically select a way based at least in part on the current occupancy.

15. A system comprising:
a system memory; and
a processor coupled with the system memory, the processor comprising:
a plurality of cores;
an N-way set associative cache where N is an integer greater than one; and
a cache control circuit coupled with the N-way set associative cache, the cache control circuit to:
receive a cache fill request for an incoming cache line corresponding to an application;
select a victim cache line in the N-way set associative cache based at least in part on a maximum occupancy bound specified for the application and a current occupancy in the N-way set associative cache for the application, wherein the maximum occupancy bound corresponds to a maximum number of ways per set to be used by the application, and wherein the current occupancy is a number of ways currently used by the application in a set indexed by the incoming cache line; and
store the incoming cache line to a location of the selected victim cache line.

16. The system of claim 15, wherein the system memory is a dynamic random access memory (DRAM), and wherein, if the current occupancy is at or above the maximum occupancy bound, the cache control circuit is to select a cache line currently used by the application in the set indexed by the incoming cache line, as the victim cache line.

17. The system of claim 15, further comprising a mass storage device coupled with the processor, and wherein the cache control circuit is to select the victim cache line based at least in part on a minimum occupancy bound specified for the application.

18. The system of claim 17, further comprising a coprocessor coupled with the processor, and wherein, if the current occupancy is less than the minimum occupancy bound, the cache control circuit is to select a cache line having a priority lower than a priority corresponding to the application in the set indexed by the incoming cache line, as the victim cache line.

19. The system of claim 15, further comprising a communication device coupled with the processor, and wherein, to select the victim cache line, the cache control circuit is to dynamically select a way based at least in part on the current occupancy.

20. A method comprising:
processing data with a plurality of cores;
storing data in an N-way set associative cache where N is an integer greater than one;
receiving, at a cache control circuit, a cache fill request for an incoming cache line corresponding to an application;
selecting, with the cache control circuit, a victim cache line in the N-way set associative cache based at least in part on a maximum occupancy bound specified for the application and a current occupancy in the N-way set associative cache for the application, wherein the maximum occupancy bound corresponds to a maximum number of ways per set to be used by the application, and wherein the current occupancy is a number of ways currently used by the application in a set indexed by the incoming cache line; and
storing the incoming cache line to a location of the selected victim cache line.

21. The method of claim 20, wherein, if the current occupancy is at or above the maximum occupancy bound, the cache control circuit is to select a cache line currently used by the application in the set indexed by the incoming cache line, as the victim cache line.

22. The method of claim 20, wherein selecting the victim cache line is also based at least in part on a minimum occupancy bound specified for the application.

23. The method of claim 22, wherein, if the current occupancy is less than the minimum occupancy bound, the cache control circuit selects a cache line having a priority lower than a priority corresponding to the application in the set indexed by the incoming cache line, as the victim cache line.

* * * * *